United States Patent [19]

Gupta et al.

[11] Patent Number: 5,560,025
[45] Date of Patent: Sep. 24, 1996

[54] ENTRY ALLOCATION APPARATUS AND METHOD OF SAME

[75] Inventors: Shantanu R. Gupta, Beaverton; James S. Griffith, Aloha, both of Oreg.

[73] Assignee: Intel Corporation, Santa Clara, Calif.

[21] Appl. No.: 40,659

[22] Filed: Mar. 31, 1993

[51] Int. Cl.$^6$ .................................................. G06F 9/00
[52] U.S. Cl. ..................... 395/800; 395/375; 364/263.3; 364/280; 364/239.4; 364/231.8; 364/261; 364/262.4; 364/DIG. 1; 364/DIG. 2
[58] Field of Search ............................ 395/800, 375; 364/DIG. 1, DIG. 2

[56] References Cited

U.S. PATENT DOCUMENTS

| | | | |
|---|---|---|---|
| 3,573,852 | 4/1971 | Watson et al. | 340/172.5 |
| 4,736,288 | 4/1986 | Shintani et al. | 364/200 |
| 4,807,115 | 2/1989 | Torng | 364/200 |
| 4,847,755 | 7/1989 | Morrison et al. | 364/200 |
| 5,056,015 | 10/1991 | Baldwin et al. | 364/200 |
| 5,121,502 | 6/1992 | Rau et al. | 395/8 |
| 5,127,093 | 10/1992 | Moore, Jr. | 395/375 |
| 5,202,987 | 4/1993 | Bayer et al. | 395/650 |
| 5,203,002 | 4/1993 | Wetzel | 395/800 |
| 5,233,694 | 8/1993 | Hotta et al. | 395/375 |
| 5,355,457 | 10/1994 | Shebanow et al. | 395/375 |
| 5,367,684 | 11/1994 | Smith | 395/700 |
| 5,399,509 | 3/1995 | Iranmanesh | 437/31 |
| 5,404,469 | 4/1995 | Chung et al. | 395/375 |
| 5,408,658 | 4/1995 | Rechtschaffen et al. | 395/650 |
| 5,430,851 | 7/1995 | Hirata et al. | 395/375 |

OTHER PUBLICATIONS

Val Popescu, et al. entitled, "The Metaflow Architecture," IEEE Micro, Jun. 1991, pp. 10–13, 63–73.

Author, Mike Johnson, entitlted *Superscalar Microprocessor Design*, Advance Micro Devices, Prentice Hall Series in Innovative Technolgoy, 1991, pp. 1–289.

*Primary Examiner*—Mehmet B. Geckil
*Assistant Examiner*—Valerie Darbe
*Attorney, Agent, or Firm*—Blakely, Sokoloff, Taylor & Zafman

[57] ABSTRACT

A method and apparatus for searching for a pattern of values indicating vacancy within a reservation station. The present invention includes a method and apparatus for search a deallocation vector of an instruction scheduler in order to locate, within one clock cycle, a pattern of the first vacancies within the instruction scheduler for storage of instruction information associated with several microprocessor instructions. The present invention advantageously locates four vacant entries of the deallocation vector which specify the first four vacancies within a reservation station of the instruction scheduler and may be utilized to locate the first four vacant entries as well. The present invention performs the above processing utilizing high speed parallel processing methods so that the entire searching, reporting and updating functions, with regard to the deallocation vector, can be completed within one clock cycle. Two embodiments of the present invention, a static and a dynamic embodiment, are presented. Advantageously utilizing the present invention, a multi-instruction processing microprocessor may quickly and efficiently, within one clock cycle, schedule up to four instructions from the instruction decoder to the execution units of the microprocessor.

23 Claims, 10 Drawing Sheets

ENTRY ALLOCATION APPARATUS AND METHOD OF SAME

BACKGROUND OF THE INVENTION

(1) Field of the Invention

The present invention relates to the field of searching an entries within an allocation designation to discover free locations. Specifically the present invention relates to the field of searching an entry vector for the first of a predetermined number of free entries within a reservation station.

(2) Prior Art

Modern microprocessors are gaining the ability to execute portions of several instructions in parallel during a single clock cycle. These microprocessors are called superscalar microprocessors and have pipelined and/or superscalar architecture. In effect, different stages of execution can be performed by a microprocessor during a single clock cycle for several different microprocessor instructions. For this reason and others, microprocessors having this ability must be able to keep track of and store information regarding several instructions at the same time and communicate this information to and from several different portions of the microprocessor in a parallel fashion. Also, because of the high operating frequencies of modern pipelined microprocessors, this instruction information must be transmitted very quickly, usually during a single clock cycle of an oscillator operating at 150-200 Megahertz. Therefore, it becomes advantageous to be able to communicate instructions and instruction data very quickly in a parallel fashion to the various units of a microprocessor.

One component within a microprocessor that must receive information regarding instructions that are being executed by a microprocessor is the instruction scheduler. The instruction scheduler holds information regarding the current instructions that are being executed as well as any data or information that is used by or in conjunction with the current instructions. The instruction scheduler has a finite memory storage capacity. Therefore, new and recent instruction information that is to be placed into the scheduler by the microprocessor must first obtain enough memory location vacancies within the instruction scheduler. That is to say, there must first be room within the scheduler before instruction information can be placed into the instruction scheduler.

A specialized deallocation vector is used by the instruction scheduler in order to indicate to the microprocessor which entries in the instruction scheduler are free and which are taken. In prior art implementations, the microprocessor would scan, one by one, each entry in the deallocation vector to locate one particular free entry of the instruction scheduler in order to store recent instruction data. However, with the introduction of microprocessors having superscalar architecture, the microprocessor must be able to search, at the same instant, the deallocation vector for up to several free entries to store information regarding several instructions during the same clock cycle. Further, as the time period between clock cycles shortens as microprocessors become faster and faster, it is important that the deallocation vector be searched very quickly as to not delay the processing of the microprocessor.

Prior art implementations used to search a deallocation vector in order to find vacancies within the instruction scheduler do not operate fast enough to complete processing within only one clock cycle (which may be on the order of 1/150th of a microsecond) or within one half clock cycle (which may be 1/300th of a microsecond) of modern superscalar microprocessors. It is not practical, given the environment of a pipelined microprocessor, to sequentially search each and every entry in a deallocation vector in order to discover, at the same instant, several vacant entries within the instruction scheduler. Since it is desired for pipelined microprocessors to execute portions of several instructions in parallel, it is unacceptable for there to be any delays associated with the search procedure of the deallocation vector of the instruction scheduler. This procedure must operate within a single clock cycle. Delays associated with such a task would reduce overall microprocessor efficiency and speed. Further, such processing delays may tend to eliminate the expansive advantages offered by microprocessors adopting pipeline architecture and associated microprocessor technology.

Therefore, what is desired is a processing scheme and apparatus that would allow very rapid searching of a deallocation vector in order to find, in one clock cycle, several vacant entries within an instruction scheduler. The present invention offers such advantageous capability.

Accordingly, it is an object of the present invention to provide a method and apparatus for searching a deallocation vector, within a single clock cycle, in order to locate several vacancies within a reservation station of an instruction scheduler. It is another object of the present invention to provide the above capability so that a pipelined architecture microprocessor can store instruction information for several instructions, which are or will be currently executed, into the instruction scheduler within the period one clock cycle. It is further an object of the present invention to provide such a system that operates very rapidly and will complete within one half of a clock cycle of the microprocessor, which may be less than 1/300th of a microsecond. Other objects of the present invention not specifically mentioned herein will become clear within the remainder of the discussions below.

SUMMARY OF THE INVENTION

A method and apparatus for searching for a pattern of values indicating vacancy within a reservation station. The present invention includes a method and apparatus for search a deallocation vector of an instruction scheduler in order to locate, within one clock cycle, a pattern of the first vacancies within the instruction scheduler for storage of instruction information associated with several microprocessor instructions. The present invention advantageously locates the first four vacant entries of the deallocation vector which specify the first four vacancies within a reservation station of the instruction scheduler. The present invention performs the above processing utilizing high speed parallel processing methods so that the entire searching, reporting and updating functions, with regard to the deallocation vector, can be completed within one clock cycle. Two embodiments of the present invention, a static and a dynamic embodiment, are presented. Advantageously utilizing the present invention, a multi-instruction processing microprocessor may quickly and efficiently, within one clock cycle, schedule up to four instructions from the instruction decoder to the execution units of the microprocessor.

A first, static, embodiment of the present invention includes an apparatus for storing instructions and instruction data into an instruction scheduler of a pipelined or superscalar microprocessor, the apparatus including: first vector means for indicating vacancies within the instruction scheduler; processing means for examining separate portions of the first vector means for vacancies and for each of the separate portions examined, for generating a plurality of indicating means associated with the each separate portion; multiplexing means for multiplexing each of the indicating means and generating therefrom an enable vector for each of the instructions to be stored in the instruction scheduler, the enable vector for indicating a vacant storage location within the instruction scheduler, the multiplexing means coupled to the processing means; and means for storing each of the instructions into the instruction scheduler according to a corresponding enable vector.

A second, dynamic, embodiment of the present invention includes an apparatus for storing instructions and instruction data into a reservation station of an instruction scheduler of a pipelined or superscalar microprocessor, the apparatus including: first vector means for indicating vacancies within the reservation station; first processing means for examining the first vector means and selecting therefrom a first priority vacancy, the first processing means also for generating a first available vector and a first enable vector, the first available vector indicating those vacancies of the first vector means not selected by the first processing means and the first enable vector indicating the first priority vacancy selected; second processing means for examining the first available vector and selecting therefrom a second priority vacancy, the second processing means also for generating a second available vector and a second enable vector, the second available vector indicating those vacancies of the first available vector not selected by the second processing means and the second enable vector indicating the second priority vacancy selected; and a pass gate logic network (or a multiported memory cell array network) coupled to the first and the second enable vectors and coupled to the instruction scheduler for directing instructions into the reservation station.

The dynamic embodiment of the present invention further include an apparatus for storing instructions and instruction data into a reservation station of an instruction scheduler of a pipelined or superscalar microprocessor as described above and further comprising: third processing means for examining the second available vector and selecting therefrom a third priority vacancy, the third processing means also for generating a third available vector and a third enable vector, the third available vector indicating those vacancies of the second available vector not selected by the third processing means and the third enable vector indicating the third priority vacancy selected; fourth processing means for examining the third available vector and selecting therefrom a fourth priority vacancy, the fourth processing means also for generating a fourth enable vector indicating the fourth priority vacancy selected; and wherein the third and fourth enable vectors are coupled to the pass gate network.

DETAILED DESCRIPTION OF THE INVENTION

Figure 1:
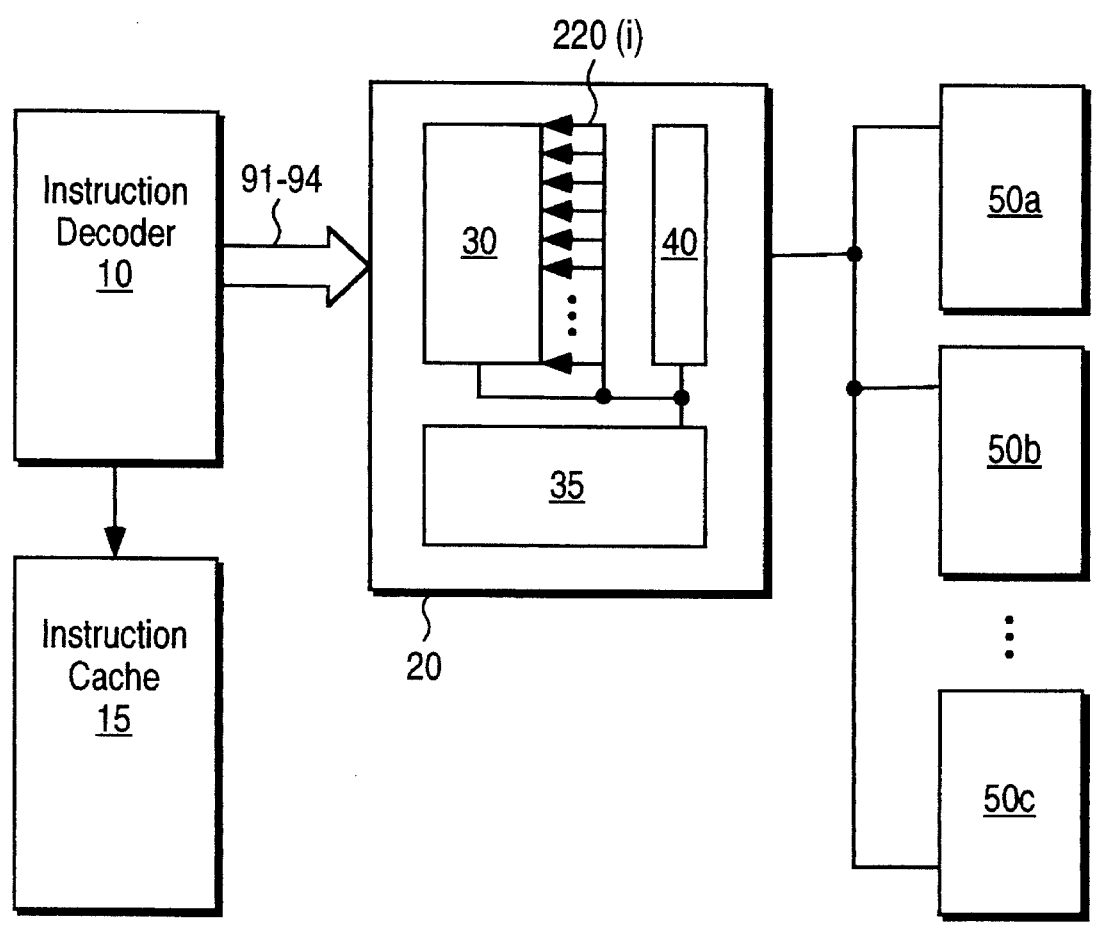
FIG. 1 is an illustration of the present invention within the environment of the overall microprocessor architecture.

The present invention includes an apparatus and method for searching a deallocation vector in order to locate, within a half or single clock cycle, several vacancies of top priority within an instruction scheduler. Once the vacancies are found, an instruction decoder can then load them with several instructions that are ready for execution. The present invention exists associated an instruction scheduler of microprocessor. The present invention operates within one clock cycle so as to not delay the processing of a pipelined microprocessor.

Specifically, an embodiment of the present invention utilizes static BiCMOs technology to implement a priority encoding scheme and will be used to search for "1s" or "0s" in a bit string vector. The result of the search will be used to generate enables for a RAM array or reservation station. The present invention is part static and part dynamic and generates 4 separate entry write enable vectors for the RAM in a very short period of time. The present invention is used to identify available RAM locations which are ready to receive instruction information. The present invention will directly activate write enable signals corresponding to the vacant entries of the RAM array. It is appreciated that the present invention can also be used to generate addresses of the vacant entries as well as directly activating write enables corresponding to these entries. Although the present invention is described as operating with four entries and with vectors and buffers of predetermined size, it is appreciated that the present invention is scalable and can easily be extended to include different sizes of the RAM array and associated enable vector.

In the following detailed description of the present invention, numerous specific details are set forth in order to provide a thorough understanding of the present invention. However, it will be obvious to one skilled in the art that the present invention may be practiced without these specific details. In other instances, well known methods, circuits, or components have not been described in detail as not to unnecessarily obscure the present invention. Throughout this detailed description, references are made to vectors. It is appreciated that all vectors of the present invention are implemented using either registers having a bit array or memory array components. That is, computation of vectors or utilization of specific vectors as related to the present invention is meant to refer to computation of or utilization of logical registers and/or physical memory locations constructed with hardware logic gates and physical quantities; to this extend, it is appreciated that the term "vector" is not meant to refer merely to a purely mathematical entity, but rather, what is meant is a vector implemented with specific hardware components and utilized by other hardware units to arrive at specific physical results and quantities.

It should be noted at the onset that this present invention operates within a pipelined architecture microprocessor.

Such a microprocessor may be utilized within a computer system. Therefore, the present invention may be advantageously utilized increase the performance of an overall computer system. In general, computer systems used by the preferred embodiment of the present invention are illustrated in block diagram format in FIG. 9. These computer systems comprise a bus 100 for communicating information, a central processor, 101 coupled with the bus for processing information and instructions, a random access memory 102 coupled with the bus 100 for storing information and instructions for the central processor 101, a read only memory 103 coupled with the bus 100 for storing static information and instructions for the processor 101, a data storage device 104 such as a magnetic disk and disk drive coupled with the bus 100 for storing information (such as audio or voice data) and instructions, a display device 105 coupled to the bus 100 for displaying information to the computer user, an alphanumeric input device 106 including alphanumeric and function keys coupled to the bus 100 for communicating information and command selections to the central processor 101, a cursor control device 107 coupled to the bus for communicating user input information and command selections to the central processor 101, and a signal generating device 108 coupled to the bus 100 for communicating command selections to the processor 101.

It is appreciated that the microprocessor 101 advantageously utilized with the present invention is a microprocessor having a pipelined architecture. Also, the microprocessor 101 may also be a superscalar microprocessor. Both of the above microprocessor types have the ability to execute portions of instructions or entire instructions in parallel. In either case or in both, the microprocessor must effectively deal with information regarding several instructions at the same time. The present invention advantageously operates in conjunction with or as an integral part of these microprocessor types. The present invention acts to quickly locate vacant entries of the instruction schedule into which to store instruction information from the instruction decoder to the execution units of the microprocessor.

Figure 9:
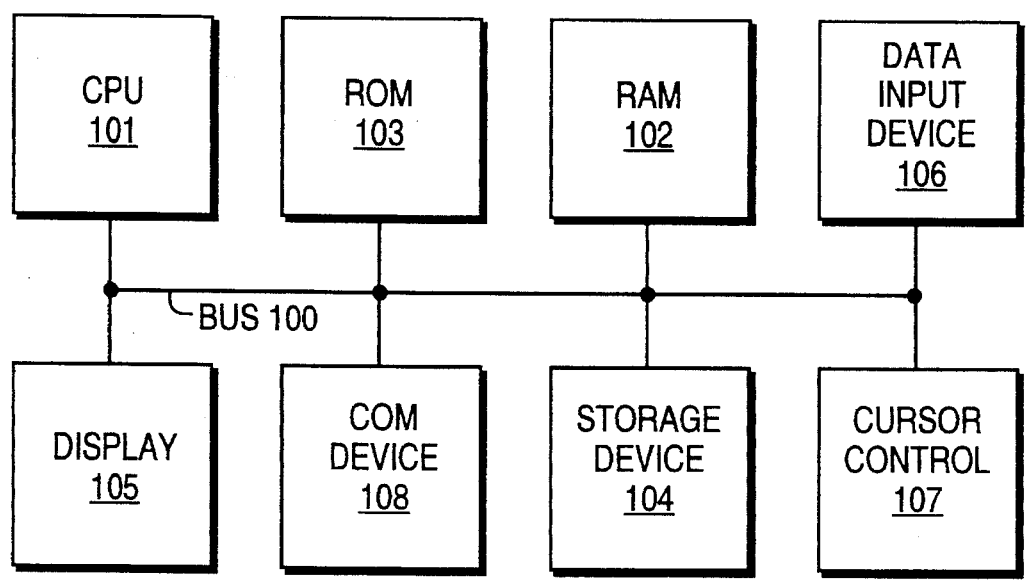
FIG. 9 illustrates an overall computer system within which the present invention may operate.

The display device 105 of FIG. 9 utilized with the computer system of the present invention may be a liquid crystal device, cathode ray tube, or other display device suitable for creating graphic images and alphanumeric characters (and ideographic character sets) recognizable to the user. The cursor control device 107 allows the computer user to dynamically signal the two dimensional movement of a visible symbol (pointer) on a display screen of the display device 105. Many implementations of the cursor control device are known in the art including a trackball, mouse, joystick or special keys on the alphanumeric input device 105 capable of signaling movement of a given direction or manner of displacement. It is to be appreciated that the cursor means 107 also may be directed and/or activated via input from the keyboard using special keys and key sequence commands.

Refer now to FIG. 1 which illustrates major components of the present invention as well as the microprocessor environment in which the present invention operates. An instruction cache unit 15 holds data regarding instructions for execution by the microprocessor 101. The instruction cache unit is coupled to an outside bus 100 (not shown in FIG. 1) through a bus control unit to communicate with ROM 103 and RAM 102 and other components of a computer system. Instructions and associated instruction data fetched from the ROM or RAM are filled into the instruction cache unit 15 and the instruction cache unit 15 feeds current instructions and instruction data into the instruction decoder 10. The instruction decoder 10 of pipelined (or superscalar) microprocessor 101 will issue several instructions and associated data at the same time. The present invention operates within the environment where the instruction decoder 10 issues four instructions and related data during the same clock cycle. It is appreciated that the system of the present invention can be extended to the cases where the instruction decoder issues more or less than four instructions simultaneously. Such extensions are within the scope of the present invention.

The instruction information associated with the four instructions issued by the microprocessor 101 at the instruction decoder 10 are fed to an instruction scheduler 20. The instruction scheduler 20 will store the instruction information until needed and will schedule execution of these instructions by several execution units 50a to 50c. The instruction scheduler 20 contains a reservation station 30 which is a static RAM array of memory. This reservation station 30 contain 24 entries numbered 0 to 23. Each entry is approximately 100 to 200 bits wide and will hold both an instruction and all the data required for execution of that instruction. The instruction scheduler 20 also contains a deallocation vector 40 that contains 24 entries numbered 0 to 23. Each entry is only 1 bit wide. The deallocation vector 40 of the present invention indicates which of the entries of the reservation station are vacant and ready to accept new instruction data and those that are filled and may not accept instruction data on this clock cycle. Each one bit entry within the deallocation vector 40 has an associated 200 bit entry of the reservation station. The first entry of the deallocation vector 40 indicates the vacancy for the first entry of the reservation station 30, the second entry of the deallocation vector indicates the vacancy for the second entry of the reservation station and so one respectively for all twenty four entries of the deallocation vector 40 and the reservation station 30.

According to the system of the present invention, a "1" marked in an entry of the deallocation vector indicates that the associated entry in the reservation station is vacant and may accept new instruction data. Therefore, a "0" marked in an entry of the deallocation vector indicates that the associated entry in the reservation station is full, and may not accept new instruction data from the instruction decoder. It is appreciated that these bit markings can be switched within the present invention wherein "1" marks a full entry and "0" marks a vacant entry. Such modification would fall within the spirit and scope of the present invention. As data is placed into these entries of the reservation station, the representative entries of the deallocation vector are marked to a "0". Similarly, as the data of these entries of the reservation stations are used and scheduled to the execution units, the corresponding entries of the deallocation vector are marked with a "1" to indicate the vacancy.

Within the instruction scheduler 35 of FIG. 1, there is also a allocation circuit 35 of the present invention. The allocation circuit 35 of the present invention is responsible for searching the bits of the deallocation vector 40 in order to locate the first four entries of the reservation station 30 that are vacant. This is done because the instruction decoder will supply information associated with four instructions for each clock cycle and these four instructions must be stored within four vacant entries within the reservation station. The allocation circuitry 35 finds not only four vacant entries, but must find four vacant entries that have the highest priority. That is, the allocation circuitry 35 must locate the first four vacant entries in the deallocation vector 40 starting from entry zero. Once the four entries are located, the allocation circuit 35 will generate four separate 24-bit enable vectors each having only one bit set. Each bit set corresponds to the location within the reservation station where a vacancy is located. These enable vectors are directly coupled to memory enable devices that will enable four locations within the reservation station 30 to accept the four instructions. Then these locations will be marked as full.

FIG. 1 also indicates that instruction execution units 50a, 50b, and 50c are coupled to the instruction scheduler. As stated above, the instruction scheduler schedules instructions received by the instruction decoder to various instruction execution units. The microprocessor 101 has several execution units, some of which may include a floating points execution unit, an integer execution unit, a jump execution unit, a memory execution unit, an arithmetic, add, and subtract execution units, as well as other execution units not specifically mentioned herein. What is appreciated is that the present invention allocation circuit 35 will locate at least four vacancies within the reservation station static RAM 30 in which to place four instructions for scheduling to the execution units 50a, 50b, and 50c. It is appreciated that for any given clock cycle, if the microprocessor 101 issues only three instructions, instead of four instructions, the present invention allocation circuit 35 will advantageously operate to store these three instructions utilizing the same circuitry that locates four vacancies. In this case, one vacancy will not be immediately filled and will remain vacant for the next clock cycle. Similarly, this capability can be extended to cases where the microprocessor issues only two instructions or one instruction at any given clock cycle. In all of these cases the present invention will operate to locate vacancies within the reservation station using the same circuitry developed to locate four vacancies within the reservation station 30.

Figure 2:
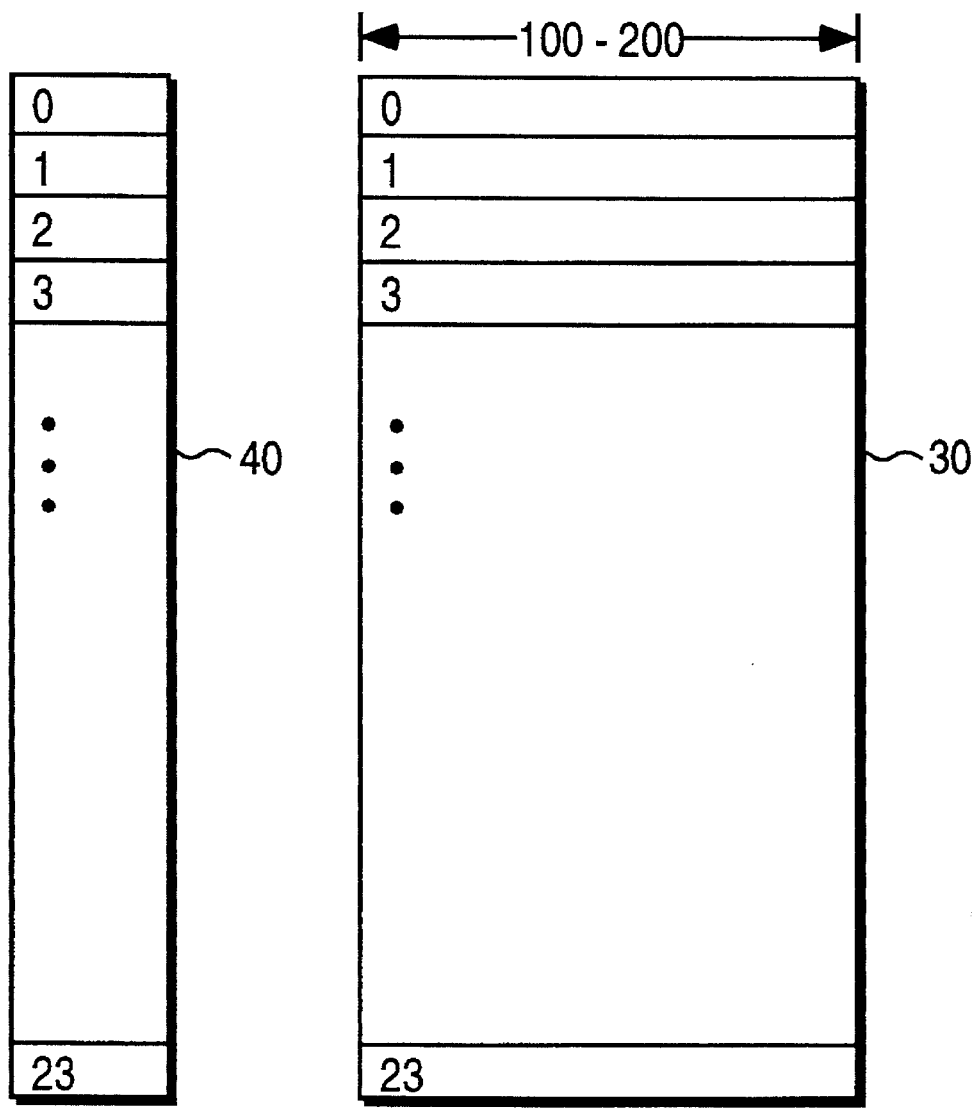
FIG. 2 is an illustration of the deallocation vector and reservation station of the present invention.

FIG. 2 illustrates a more detailed diagram of the deallocation vector 40 and the reservation station 30. The deallocation vector is made up of 24 entries numbered zero to twenty-three and is only one bit wide. Each entry is considered a pointer to a corresponding entry with the same number of the reservation station 30. The pointer indicates whether or not the corresponding entry in the reservation station may accept new instruction data. The reservation station 30 is a static RAM memory array having twenty-four entries numbered zero to twenty-three. Each entry is from 100 to 200 bits wide. Each entry may hold the instruction and its associated data for execution by the execution units. Using the deallocation vector and the reservation station, the present invention searches the deallocation vector to locate the entries containing the first four "1s" of the vector.

The major processing tasks performed by the allocation circuit 35 of the present invention in order to locate the first four "1s" of the deallocation vector are three fold. First, the allocation circuit 35 generates a set of twelve bitmap vectors by examining the deallocation vector 40. Second, the present invention allocation circuit 35 will multiplex these twelve bitmap vectors to create four separate 24-bit enable vectors, each having at most one bit set within the vector. Third, the present invention will utilize the four separate 24-bit enable vectors to directly enable four memory locations within the reservation station 30 for storage of the instruction data. Lastly, the present invention will update the status of the deallocation vector 40 to reflect that these four memory locations are no longer vacant but hold valid instruction data.

I. Static Embodiment Implementation

The following discussion illustrates the static implementation of the present invention four entry allocation mechanism. In this embodiment, the searching processes is divided into three processes and looks for available entries in each group having 8 bits. Since up to four instructions (uops) need to be allocated on each cycle, each vector looks for an available entry in the group of 8. This process first generates 12 bitmaps, out of which four are selected using a priority multiplexer. This embodiment is static in so far as the generation of the 12 bitmaps is done in a static fashion. The muxing is done on the rising clock edge using a dynamic circuit. The 4 bitmaps that directly activate the write enables of the reservation station are then generated.

Generation of the Twelve Bitmap Vectors 300–311

Figure 3:
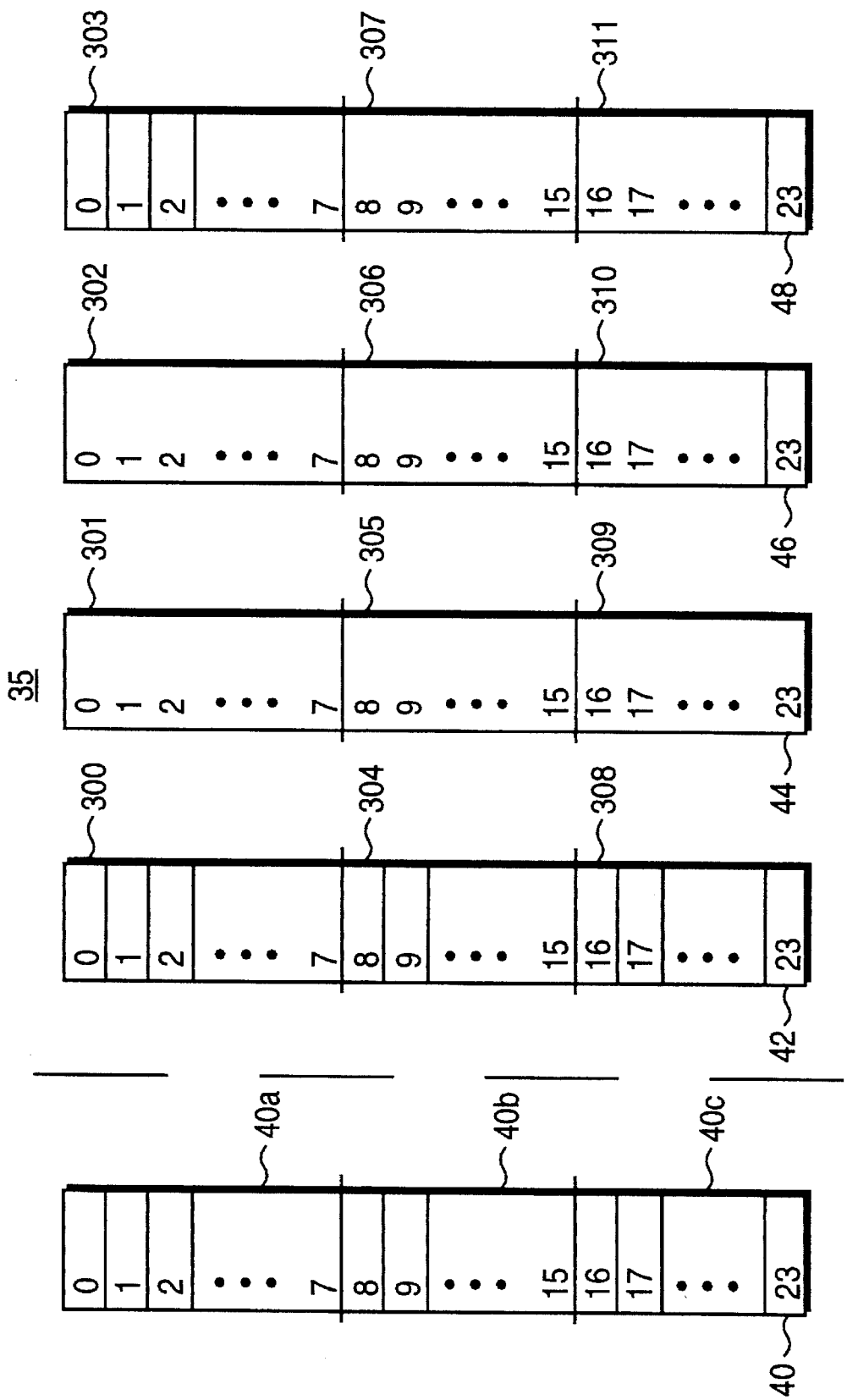
FIG. 3 illustrates the deallocation vector and the 12 bitmap vectors generated at an intermediate step of the present invention within the instruction scheduler.

FIG. 3 illustrates the procedure implemented by one embodiment, the static embodiment, of the allocation circuit 35 present invention that performs the first step of generating the twelve bitmap vectors 300–311. Each of the twelve bitmap vectors is eight bits long and all twelve are organized according to sets of three bitmap vectors. There are four sets of three. Each set of three corresponds to a separate issued instruction, therefore there are four separate sets of three. Within a particular set, each vector corresponds to a separate portion (40a, 40b, 40c) of the deallocation vector 40. Each bitmap vector of a set is simultaneously generated, and the sets are sequentially generated, that is, the deallocation circuit 35 first simultaneously generates bitmap vectors 300, 304 and 308. Next, 301, 305 and 309 are simultaneously generated and then bitmap vectors 302, 306 and 310 are simultaneously generated by the allocation circuit 35 of the present invention. Lastly, bitmap vectors 303, 307 and 311 are simultaneously generated by the allocation circuit 35. Note that bitmap vectors 300, 304 and 308 make up 24-bit vector 42, vectors 301, 305 and 309 make up 24-bit vector 44. Vectors 302, 306 and 310 constitute 24-bit vector 46 and lastly vectors 303, 307, and 311 comprise 24-bit vector 48. According to the method of the circuitry of the present invention, vector 42 is generated first, followed by vector 44, 46 and then vector 48. Initially all the bits of the vectors 300–311 are reset to zero.

Note that the deallocation vector 40 is separated into three 8-bit sections numbered 40a, 40b and 40c. Bitmap vectors 300, 301, 302, and 303 will search vector section 40a in respective priority in order to locate and take a 1 of vector section 40a. Vector 300 takes the first 1 (if there is one at all), vector 301 the second (if a second exists), 302 the third (if a third exists) and 303 the fourth 1 (if a fourth exists). Similarly, vectors 304, 305, 306, and 307 search vector section 40b with bitmap vector 304 taking the first 1 of section 40b, 305 the second, 306 the third, and 307 the fourth 1. Bitmap vectors 308, 309, 310, and 311 search vector section 40c with bitmap vector 308 taking the first 1 of section 40c, 309 the second, 310 the third, and 311 the fourth 1. The present invention operates such that each bitmap vector that searches a particular vector section (40a, 40b, or 40c) processes on a priority scheme with the previous bitmap vector having higher priority to take an available one. Note that each bitmap vector may take only a single available 1 from any section of the deallocation vector 40.

More specifically, the circuitry of the present invention is implemented such that 8-bit vector 300 of FIG. 3 will contain a 1 in an entry (0 to 7) corresponding to the first 1 found in the entries (0 to 7) of section 40a of deallocation vector 40. If no 1 is found in section 40a then all of the bits of vector 300 will be zero. Similarly, vector 304 will contain a 1 in an entry (8 to 15) representing the first entry having a 1 in section 40b of the deallocation vector. If no 1 is found in section 40b then all of the bits of vector 304 will be zero. Lastly, bitmap vector 308 will be given a one in an entry (16 to 23) representing the first occurrence of a 1 within the entries of section 40c of the deallocation vector. If no 1 is found in section 40c then all of the bits of vector 308 will remain zero. The processing of the circuitry within the allocation circuit 35 that generates vectors 300, 304 and 308 occurs in parallel. The logic gates utilized to implement these functions may be any that conform to the above specified procedures and conditions as long as the bitmap vector 301–311 are generated as specified above.

The present invention first determines bitmap vectors 300, 304 and 308 of FIG. 3. An example is given of the logic conditions and logic gates that can be used to implement the procedure utilized by the present invention to determine the bit set in each vector 300, 304 and 308. First, entry 0 of vector 300 will be a 1 if entry 0 of vector 40 is a 1. Second, entry 1 of vector 300 will be a 1 if entry 1 of vector 40 is a 1 and entry 0 of vector 40 is a 0 because if entry 0 of vector 40 was a 1 then vector 300 already will have an entry set to one and each vector 300–311 can only take a single 1. Since vector 300 is satisfied, entry 1 will remain zero. Third, entry 2 of vector 300 will be a 1 if entry 2 of vector 40 is a 1 and entries 0–1 of vector 40 are zero. Fourth, entry 3 of vector 300 will be a 1 if entry 3 of vector 40 is a 1 and entries 0–2 of vector 40 are zero. Fifth, entry 4 of vector 300 will be a 1 if entry 4 of vector 40 is a 1 and entries 0–3 of vector 40 are zero. Sixth, entry 5 of vector 300 will be a 1 if entry 5 of vector 40 is a 1 and entries 0–4 of vector 40 are zero. Seventh, entry 6 of vector 300 will be a 1 if entry 6 of vector 40 is a 1 and entries 0–5 of vector 40 are zero. Eighth, entry 7 of vector 300 will be a 1 if entry 7 of vector 40 is a 1 and entries 0–6 of vector 40 are zero. Each of the above eight conditions occurs simultaneously and is implemented by standard logic circuits within the present invention. It should be noted that the above conditions equally apply to bitmap vectors 304 and 308 where bitmap vector 304 is generated based on vector section 40b while bitmap vector 308 is generated based on vector section 40c.

Utilizing the above eight conditions for each bitmap vector (300, 304, and 308) and employing AND gates, OR gates, other logic gates, and latches to create an 8-bit register for vectors 300, 304, and 308, circuitry of the present invention allocation circuit 35 can be generated. It is appreciated that any number of different, specific, implementations of logic can be supplied to accomplish the above tasks of the present invention. What is important is the overall procedure executed by the present invention to arrive at the values of vector 300 and the other bitmap vectors 301–311. Similarly, employing the conditions as expressed above, entries of the bitmap vector 304 are respectively generated based on the entries of section 40b and the entries of bitmap vector 308 are respectively generated by the present invention based on entries of section 40c of the deallocation vector 40. It is appreciated that specific implementation logic is described in Tables 1–4 that provide the logical conditions for bitmap vectors 300–303 and extend to bitmap vectors 304–311.

The entries of vectors 301, 305 and 309 are next computed by the allocation circuitry 35 of the present invention. Since each bitmap vector takes 1s of its associated section (40a, 40b, or 40c) in a priority scheme, the value given to bitmap vector 301 will be determined based on the value of bitmap vector 300 and the values of vector 40a. Bit map vector 302 will be a function of vector section 40a, vector 301 and vector 300. Bit map vector 303 will be a function of vector 302, 301 and 300 and section 40a. That is, bitmap vector 301 cannot take the first 1 present in section 40a, this one belongs to vector 300. Vector 301 can only take the second 1 found in section 40a. Likewise, vector 302 takes only the third 1 found in section 40a while section 303 can only take the fourth 1 found in section 40a.

A typical implementation of the logic required to construct the entries for vectors 301–303 is given. Entry 0 of vector 301 can never be 1 because this would mean that entry 0 of vector 40 was a 1 and therefore entry 0 of the higher priority vector 300 would have already taken this 1. Entry 1 of vector 301 may be 1 if entry 1 of vector 40 is the second 1 of vector 40a, that is, entry 0 of vector 40 was also a 1. Entry 2 of vector 301 may be a 1 if entry 2 of vector 40a is the second 1 of vector 40a. Likewise, entry n (3 to 7) of vector 301 may be a 1 if entry n (3 to 7) of vector 40a is the second 1 of vector 40a. Similarly, with regard to vector 302, entries 0 and 1 can never be a 1 because vectors 300 and 301 would have taken the 1 before. For the remainder of the entries (2 to 7), an entry n, will only be a one if it is the third one of section 40a. With regard to vector 303, entries 0–2 can never be a 1 because vectors 300, 301 or 302 would have taken the 1 before. For the remainder of the entries (3 to 7), an entry n of vector 303, will only be a one if it is the third one of section 40a. Thus, vector 300 is a function of vector 40a, that is, vector 300=f(40a); vector 301=f(300, 40a); vector 302=f(301, 300, 40a); and vector 303=f(302, 301, 300, 40a).

The remainder of the vectors 304 to 307 of FIG. 3 are computed by the present invention similarly to vectors 300 to 303 but vector section 40b is analyzed instead of vector section 40a. And vectors 308 to 311 are computed by the present invention similarly to vectors 300 to 303 but vector section 40c is analyzed instead of vector section 40a. That is vector 304 takes the first 1 of section 40b, if any, vector 305 the second one of section 40b, if any, vector 306 the third one, if any, and lastly vector 307 takes the fourth one, if any. Vector 308 takes the first 1 of section 40c, if any, vector 309 the second one of section 40c, if any, vector 310 the third one, if any, and lastly vector 311 takes the fourth one, if any.

A specific implementation of the logical conditions of the present invention allocation circuitry 35 is disclosed. The conditions are implemented using AND and OR logic gates (NAND and NOR) and other transistor logic in hardware form or could be implemented via PAL or PROM logic. It is appreciated that the present invention is not limited to such specific implementation as there are numerous implementations available to provide the above procedures to arrive at the bitmap vectors 300–311. The logical conditions utilized by the present invention in order to realize the circuitry of the allocation circuit 35 for bitmap vectors 300, 301, 302 and 303 are presented below in the following Tables 1–4 respectively. These tables illustrate the logical conditions utilized by the present invention to arrive at each entry of bitmap vectors 300–303 given the values of the entries of vector segment 40a as an input (i.e., a0 to a7). It is appreciated that these logical conditions disclosed can easily be extended to apply to the generation of the other bitmap vectors 304–311 by referencing the entries of vector sections 40b (for vectors 304–307) and the entries of vector segment 40c (for vectors 308 to 311) instead of section 40a. In the following tables the terminology a0 to a7 refers to the entries 0 to 7 of the allocation vector 40. To determine the values of vectors 304 to 307 utilize entries 8 to 15 of the deallocation vector 40 and similarly to compute the values for vectors 308 to 311 utilize entries 16 to 23 of the deallocation vector 40.

Where:

Rg00=Vector 300 allocated at least one entry of 0–3 entries

Rg10=Vector 300 allocated at least one entry of 4–7 entries

Rg01=Vector 301 allocated at least one entry of 0–3 entries

Rg11=Vector 301 allocated at least one entry of 4–7 entries

Rg02=Vector 302 allocated at least one entry of 0–3 entries

Rg12=Vector 302 allocated at least one entry of 4–7 entries

Rg03=Vector 303 allocated at least one entry of 0–3 entries

Rg13=Vector 303 allocated at least one entry of 4–7 entries

TABLE 1

Logical Conditions for Bitmap Vector 300:

Entry 0 = $a_0$
Entry 1 = $(\bar{a}_0 \cdot a_1)$
Entry 2 = $(\bar{a}_0 \cdot \bar{a}_1 \cdot a_0)$
Entry 3 = $(\bar{a}_0 \cdot \bar{a}_1 \cdot \bar{a}_2 \cdot a_3)$
Entry 4 = $\overline{Rg\emptyset\emptyset} \cdot a_4$
Entry 5 = $\overline{Rg\emptyset\emptyset} \cdot (\bar{a}_4 \cdot a_5)$
Entry 6 = $\overline{Rg\emptyset\emptyset} \cdot (\bar{a}_4 \cdot \bar{a}_5 \cdot a_6)$
Entry 7 = $\overline{Rg\emptyset\emptyset} \cdot (\bar{a}_4 \cdot \bar{a}_5 \cdot \bar{a}_6 \cdot a_7)$

TABLE 2

Logical Conditions for Bitmap Vector 301:

Entry 0 = 0
Entry 1 = $a_0 \cdot a_1$
Entry 2 = $(\bar{a}_0 \cdot a_1 + a_0 \cdot \bar{a}_1) \cdot a_2$
Entry 3 = $(a_0 \cdot \bar{a}_1 \cdot \bar{a}_2 + \bar{a}_0 \cdot a_1 \cdot \bar{a}_2 + \bar{a}_0 \cdot \bar{a}_1 \cdot a_2) \cdot a_3$
Entry 4 = $\overline{Rg\emptyset\emptyset} \cdot \overline{Rg\emptyset 1} \cdot a_4$
Entry 5 = $\overline{Rg\emptyset\emptyset} \cdot a_4 \cdot a_5 + \overline{Rg\emptyset\emptyset} \cdot \bar{a}_4 \cdot a_5$
Entry 6 = $\overline{Rg\emptyset 1} \cdot [\bar{a}_4 \cdot a_5 + a_4 \cdot \bar{a}_5] \cdot a_6 \cdot \overline{Rg\emptyset\emptyset} +$
$Rg\emptyset\emptyset \cdot \overline{Rg\emptyset 1} \cdot \bar{a}_4 \cdot \bar{a}_5 \cdot a_6$
Entry 7 = $\overline{Rg\emptyset 1} \cdot [\bar{a}_4 \cdot \bar{a}_5 \cdot a_6 + a_4 \cdot \bar{a}_5 \cdot \bar{a}_6 + \bar{a}_4 \cdot a_5 \cdot \bar{a}_6] \cdot a_7$

TABLE 3

Logical Conditions for Bitmap Vector 301:

Entry 0 = 0
Entry 1 = 0
Entry 2 = $a_0 \cdot a_1 \cdot a_2$
Entry 3 = $(a_0 \cdot a_1 \cdot \bar{a}_2 + a_0 \cdot \bar{a}_1 \cdot a_2 + \bar{a}_0 \cdot a_1 \cdot a_2) \cdot a_3$
Entry 4 = $\overline{Rg\emptyset\emptyset} \cdot \overline{Rg\emptyset 1} \cdot \overline{Rg\emptyset 2} \cdot a_4$
Entry 5 = $(\overline{Rg\emptyset 2} \cdot \overline{Rg\emptyset\emptyset} \cdot Rg11) \cdot \bar{a}_4 \cdot a_5$
Entry 6 = $[\overline{Rg\emptyset\emptyset} \cdot \overline{Rg\emptyset 1} [a_4 \cdot \bar{a}_5 + \bar{a}_4 \cdot a_5] +$
$\overline{Rg\emptyset\emptyset} \cdot Rg\emptyset 1 \cdot \underline{a_4 \cdot a_5} +$
$Rg\emptyset\emptyset \cdot Rg\emptyset 1 \cdot \overline{Rg\emptyset 2} \cdot \bar{a}_4 \cdot \bar{a}_5] \cdot a_6$
Entry 7 = $[\overline{Rg\emptyset\emptyset} \cdot Rg\emptyset 1 \cdot \overline{Rg\emptyset 2} \cdot \bar{a}_4 \cdot \bar{a}_5 \cdot \bar{a}_0 +$
$\overline{Rg\emptyset\emptyset} \cdot \overline{Rg\emptyset 1} \cdot [a_4 \cdot \bar{a}_5 \cdot \bar{a}_6 + \bar{a}_4 \cdot \bar{a}_5 \cdot a_6 + \bar{a}_4 \cdot \bar{a}_5 \cdot a_6] +$
$\overline{Rg\emptyset\emptyset} \cdot [a_4 \cdot a_5 \cdot \bar{a}_6 + \bar{a}_4 \cdot a_5 \cdot a_6 + a_4 \cdot \bar{a}_5 \cdot a_6]] \cdot a_7$

TABLE 4

Logical conditions for bitmap vector 303:

Entry $\emptyset$ = 0
Entry 1 = 0
Entry 2 = 0
Entry 3 = $a_0 \cdot a_1 \cdot a_2 \cdot a_3$
Entry 4 = $Rg\emptyset\emptyset \cdot Rg\emptyset 1 \cdot Rg\emptyset 2 \cdot \overline{Rg\emptyset 3} \cdot a_4$
Entry 5 = $Rg\emptyset\emptyset \cdot Rg\emptyset 1 \cdot Rg\emptyset 2 \cdot \overline{Rg\emptyset 3} \cdot \bar{a}_4 \cdot a_5$
Entry 6 = $[Rg\emptyset\emptyset \cdot Rg\emptyset 1 \cdot Rg\emptyset 2 \cdot \overline{Rg\emptyset 3} \cdot \bar{a}_4 \cdot \bar{a}_5 +$
$Rg\emptyset\emptyset \cdot \overline{Rg\emptyset 1} \cdot \overline{Rg\emptyset 2} \cdot [\bar{a}_4 \cdot a_5 + a_4 \cdot \bar{a}_5] +$
$\overline{Rg\emptyset\emptyset} \cdot \overline{Rg\emptyset 1} \cdot a_4 \cdot a_5] \cdot a_6$ TABLE 4-continued Logical conditions for bitmap vector 303:

Entry 7 = $[Rg\emptyset\emptyset \cdot Rg\emptyset 1 \cdot Rg\emptyset 2 \cdot \overline{Rg\emptyset 3} \cdot \bar{a}_4 \cdot \bar{a}_5 \cdot \bar{a}_6 +$
$Rg\emptyset\emptyset \cdot \overline{Rg\emptyset 1} \cdot \overline{Rg\emptyset 2} [a_4 \cdot \bar{a}_5 \cdot \bar{a}_6 + \bar{a}_4 \cdot \bar{a}_5 \cdot a_6 + \bar{a}_4 \cdot a_5 \cdot \bar{a}_6] +$
$\overline{Rg\emptyset\emptyset} \cdot \overline{Rg\emptyset 1} [a_4 \cdot a_5 \cdot \bar{a}_6 + \bar{a}_4 \cdot a_5 \cdot a_6 + a_4 \cdot \bar{a}_5 \cdot a_6] +$
$\overline{Rg\emptyset\emptyset} [a_4 \cdot a_5 \cdot a_6]] \cdot a_7$ A few examples are presented. Assume that the deallocation vector contains four 1s and they are set at entries: 4, 5, 15, and 20 of the vector. Therefore, section 40a contains two 1s, section 40b contains one of the 1s, and section 40c contains the other. The allocation circuitry 35 will process the deallocation vector 40 according to the logical conditions above and bitmap vector 300 will have a one 1 set in entry 4 by taking the first 1. Bitmap vector 301 will take the second 1 of 40a and entry 5 will be set in this vector. Vectors 302 and 303 will remain zero. Bitmap 304 will have entry 15 set as it takes the only 1 of 40b. Bitmap 308 takes the only one of 40c and entry 23 is set. Vectors 305 to 307 and 309 to 311 will remain set at zero. According to the timing scheme of the present invention, vectors 300, 304 and 308 are computed first, then vectors 301, 305 and 309, then 302, 306 and 310 and lastly 303, 307 and 311. Assume next that the allocation vector 40 had four 1s set in entries: 9, 10, 11, and 12 so that all the 1s were in section 40b. In this case vectors 300 to 303 would remain zero. Vectors 304, 305, 306 and 307 would each have a single bit set in each vector at the entries 9, 10, 11 and 12 respectively. Vectors 308 to 311 would remain zero as no 1s would be in section 40c.

Multiplexing the Bitmap Vectors to Generate the Enable Vectors

Figure 4:
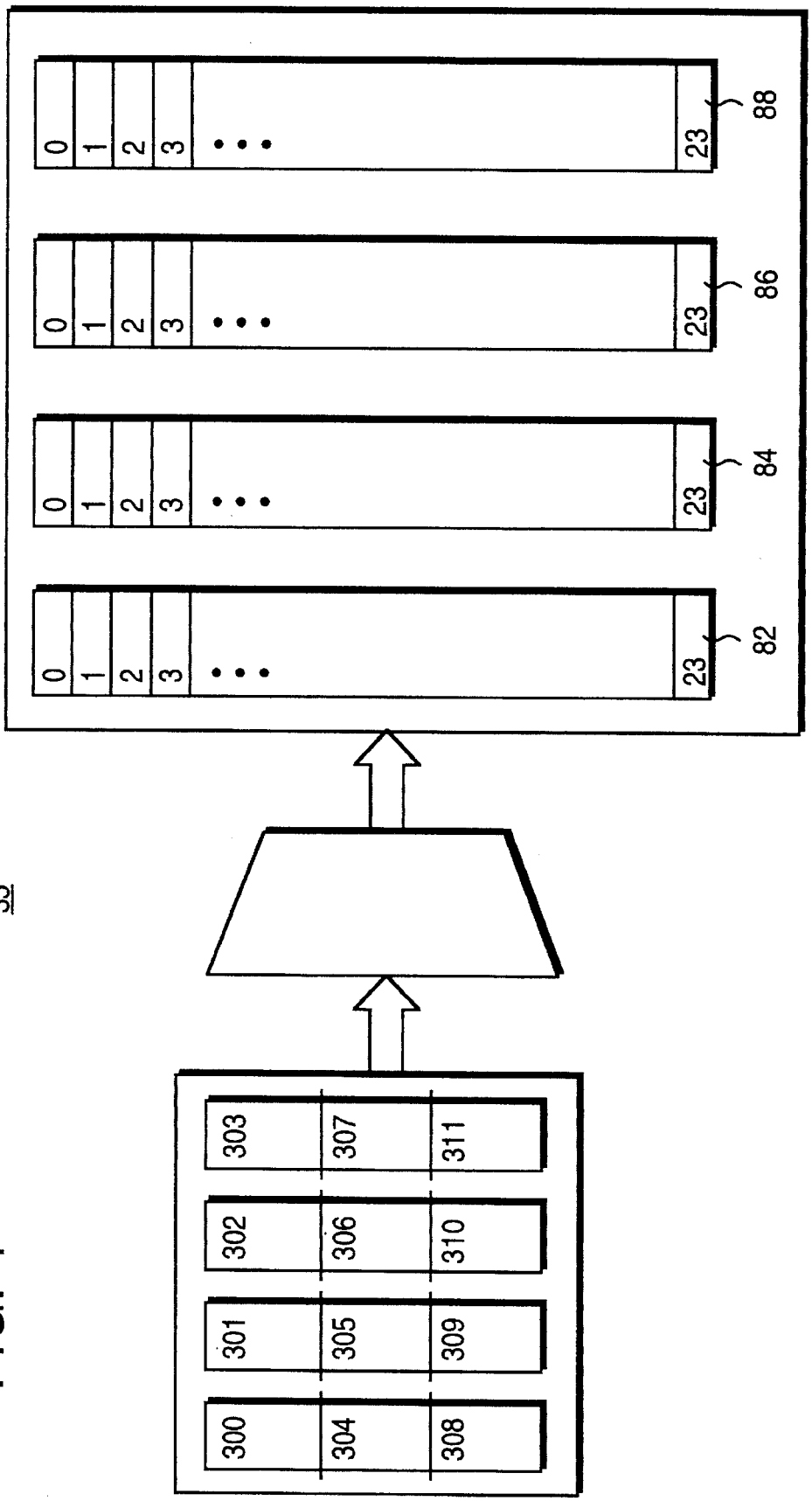
FIG. 4 illustrates the multiplexing operation of the present invention to create four enable vectors.

FIG. 4 illustrates the next processing step of the static embodiment of the present invention allocation circuit 35. FIG. 4 illustrates the 12 bitmap vectors 300–311 entering a multiplexing circuit 75 which produces four enable vectors 82, 84, 86, and 88 as an output. The multiplexing circuit 75 is part of the allocation circuit 35 of the present invention. After the twelve bitmap vectors 300–311 are generated, the present invention signals the multiplexing circuit 75 to generate four 24-bit enable vectors 82, 84, 86 and 88 each having only one bit set. These enable vectors will be tied directly to write enable gates of the reservation station 30 entries. The present invention will read the status of the twelve vectors 300–311 and pass them through a specialized multiplexer circuit 75 which will generate an output of four 24-bit enable vectors, each enable vector having only 1 bit set. The enable vectors will each take the highest priority of the 1s found within the bitmap vectors. Therefore, if the deallocation vector 40 had 1s set in the following entries: 4, 10, 18, and 23 then enable vector 82 would have entry 4 set to 1 and all other entries set to zero, enable vector 84 would have entry 10 set to 1 with others zero, enable vector 86 would have entry 18 set to 1 with others zero and lastly enable vector 88 would have entry 23 set to 1 with others set to zero.

The processing strategy of the multiplexing circuit 75 is to examine the 12 bitmap vectors 300–311 and to take the highest priority of the 1s set according to vectors 42, 44, 46, and 48. Because of the allocation system of the present invention that generated vectors 42, 44, 46, and 48, there may be more than a single 1 within any given vector. The enable vectors 82, 84, 86, and 88 only will contain a single 1, at most, within each vector. Therefore, each of the enable vectors will be generated by first searching bitmap vectors 42, 44, 46, and 48 and taking the highest priority 1 found in the first entry number. If multiple 1s are found in a particular bitmap vector, then the second 1 can be used to generate the next enable vector. Therefore, if two 1s exist within bitmap vector 42 then the first 1 can be used to form enable vector 82 while the second 1 can be used to form enable vector 84 depending on the priority of the that 1 or other 1s within bitmap vector 44. It should be noted that the present invention locates the first four 1s within the deallocation vector 40, so allocation priority is very important to the processing of the present invention.

According to the processing logic of the present invention, enable vector 82 will select from bitmap vector 42. Enable vector 84 will select from bitmap vector 44 and any carryovers from bitmap vector 42. Enable vector 86 will select from bitmap vector 46 and any carryovers from bitmaps 42 and 44. Lastly, enable vector 88 will select from bitmap vector 48 and any carryovers from bitmap vectors 42, 44 or 46.

Therefore, the multiplexing circuit 75 of the FIG. 4 performs two basic functions. First, for any given bitmap vector 42, 44, 46, or 48, the present invention selects bitmap vector 300–311 containing the highest priority 1 (measured by the entry with the lowest number) and equates that bitmap vector with an associated enable vector 82, 84, 86, and 88. Second, if there are remainder 1s set in a particular bitmap vector 42, 44, 46, or 48, then they are made available for the next bitmap vector in priority. For example, assume that bitmaps 300 (entry 3), 304 (entry 10) and 309 (entry 22) are set with a 1 while vectors 301, 305, and 308 are zero. The multiplexing circuits would place the 1 of bitmap 300 into enable vector 82 at entry 3 and enable vector 82 would be complete. Next, the circuits 75 would make the 1 of bitmap vector 304 available for the selection of enable vector 84. Enable vector 84 can therefore select either bitmap 304 (entry 10) or bitmap 309 (entry 22). Because the entry at 10 is of higher priority than entry 22, the present invention constructs enable vector 84 with bitmap 304 (entry 10) and carry forward bitmap 309 to the processing for enable vectors 86 and 88 depending on the state of the other bitmap vectors 302–303, 306–307 and 310–311. In so doing the present invention constructs the enable vectors 82, 84, 86, and 88 by prioritizing the enable bits.

For instance, generation of enable vector 82 of FIG. 4 is the most straight forward. Enable vector 82 will take the 1 of the entry of bitmap vector 300 if there is a one in that bitmap vector. Enable vector 82 will take the 1 of the entry of bitmap vector 304 if there is a bit in that bitmap and if bitmap vector 300 is zero. Enable vector 82 will take the 1 of the entry of bitmap vector 308 if there is a one in that bitmap vector and if bitmap vector 300 is zero and if bitmap vector 304 is zero. Table 5 illustrates the specific logical conditions executed by the present invention allocation circuit 35 to perform the multiplexing operations done in multiplexing circuit 75. It is appreciated that the present invention implements these logical conditions with logic gates, registers, and other hardware components. It is further appreciated that a number of specific logic implementations of the below equations can be accomplished and these would come within the scope of the present invention.

According to the terminology of Table 5, the following terms are utilized:

$V_0$=a bit is set in bitmap vector 300

$V_1$=a bit is set in bitmap vector 301

$V_2$=a bit is set in bitmap vector 302

$V_3$=a bit is set in bitmap vector 303

$V_4$=a bit is set in bitmap vector 304

$V_5$=a bit is set in bitmap vector 305

$V_6$=a bit is set in bitmap vector 306

$V_7$=a bit is set in bitmap vector 307

$V_8$=a bit is set in bitmap vector 308

$V_9$=a bit is set in bitmap vector 309

$V_{10}$=a bit is set in bitmap vector 310

$V_{11}$=a bit is set in bitmap vector 311 and

BMVn=the bitmap of vector n

TABLE 5

Generation of the Enable Vectors:

Enable Vector 82 =
$BMV_{300} \cdot V_0 + BMV_{304} \cdot V_4 \cdot \bar{V}_0 +$
$BMV_{308} \cdot V_8 \cdot \bar{V}_4 \cdot \bar{V}_0$
Enable Vector 84 =
$BMV_{301} \cdot V_1 + [BMV_{304} \cdot V_0 \cdot V_4 + BMV_{305} \cdot V_5 \cdot \bar{V}_0 +$
$BMV_{308} \cdot (\bar{V}_0 \cdot \bar{V}_4 + V_0 \cdot V_4) \cdot \bar{V}_5 \cdot V_8 +$
$BMV_{309} \cdot V_9 \cdot \bar{V}_0 \cdot \bar{V}_4] \cdot \bar{V}_1$
Enable Vector 86 =
$BMV_{302} \cdot V_2 + BMV_{304} \cdot V_4 \cdot V_1 \cdot \bar{V}_2 + BMV_{305} \cdot V_5 \cdot V_0 \cdot \bar{V}_1 +$
$BMV_{306} \cdot V_6 \cdot \bar{V}_0 +$
$BMV_{308} \cdot V_8 \cdot (\bar{V}_0 \cdot \bar{V}_1 \cdot V_4 \cdot \bar{V}_5 + V_1 \cdot \bar{V}_2 \cdot \bar{V}_4) +$
$BMV_{309} \cdot V_9 (V_0 \cdot \bar{V}_1 \cdot \bar{V}_4 + \bar{V}_0 \cdot V_4 \cdot \bar{V}_5) +$
$BMV_{310} \cdot V_{10} \cdot \bar{V}_0 \cdot \bar{V}_4$
Enable Vector 88 =
$BMV_{303} \cdot V_3 + BMV_{304} \cdot V_2 \cdot \bar{V}_3 \cdot V_4 +$
$BMV_{305} \cdot V_1 \cdot \bar{V}_2 \cdot V_5 +$
$BMV_{306} \cdot V_0 \cdot \bar{V}_1 \cdot V_6 + BMV_{307} \cdot \bar{V}_0 \cdot V_7 +$
$BMV_{308} \cdot V_8 \cdot (V_2 \cdot \bar{V}_3 \cdot \bar{V}_4 + V_1 \cdot \bar{V}_2 \cdot V_4 \cdot \bar{V}_5 +$
$V_0 \cdot \bar{V}_1 \cdot V_5 \cdot \bar{V}_6 + \bar{V}_0 \cdot V_6 \cdot \bar{V}_7) +$
$BMV_{309} \cdot V_9 \cdot (V_1 \cdot \bar{V}_2 \cdot \bar{V}_4 + V_0 \cdot \bar{V}_1 \cdot V_4 \cdot \bar{V}_5 + \bar{V}_0 \cdot V_5 \cdot \bar{V}_6)$
$+$
$BMV_{310} \cdot V_{10} \cdot (V_0 \cdot \bar{V}_1 \cdot \bar{V}_4 + \bar{V}_0 \cdot V_4 \cdot \bar{V}_5) +$
$BMV_{311} \cdot V_{11} \cdot \bar{V}_0 \cdot \bar{V}_4$ As the logic conditions of Table 5 illustrate, each of the entry vectors 82, 84, 86 and 88 can be generated by the present invention multiplexing circuits 75 in parallel. That is, the enable vectors are not functions of each other, but rather, they are functions of the bitmap vectors 300–311. Therefore, the logic required to construct the enable vectors that operates within the multiplexing circuits 75 performs simultaneously to generate the four enable vectors once the bitmap vectors 300–311 have been generated by other hardware of the allocation circuitry 35. Once the enable vectors are generated, they are utilized the further circuitry of the present invention in order to allow the four instructions and associated information to be placed in the four indicated vacant entries of the reservation station 30.

Enabling of the Reservation Station 30

Figure 5:
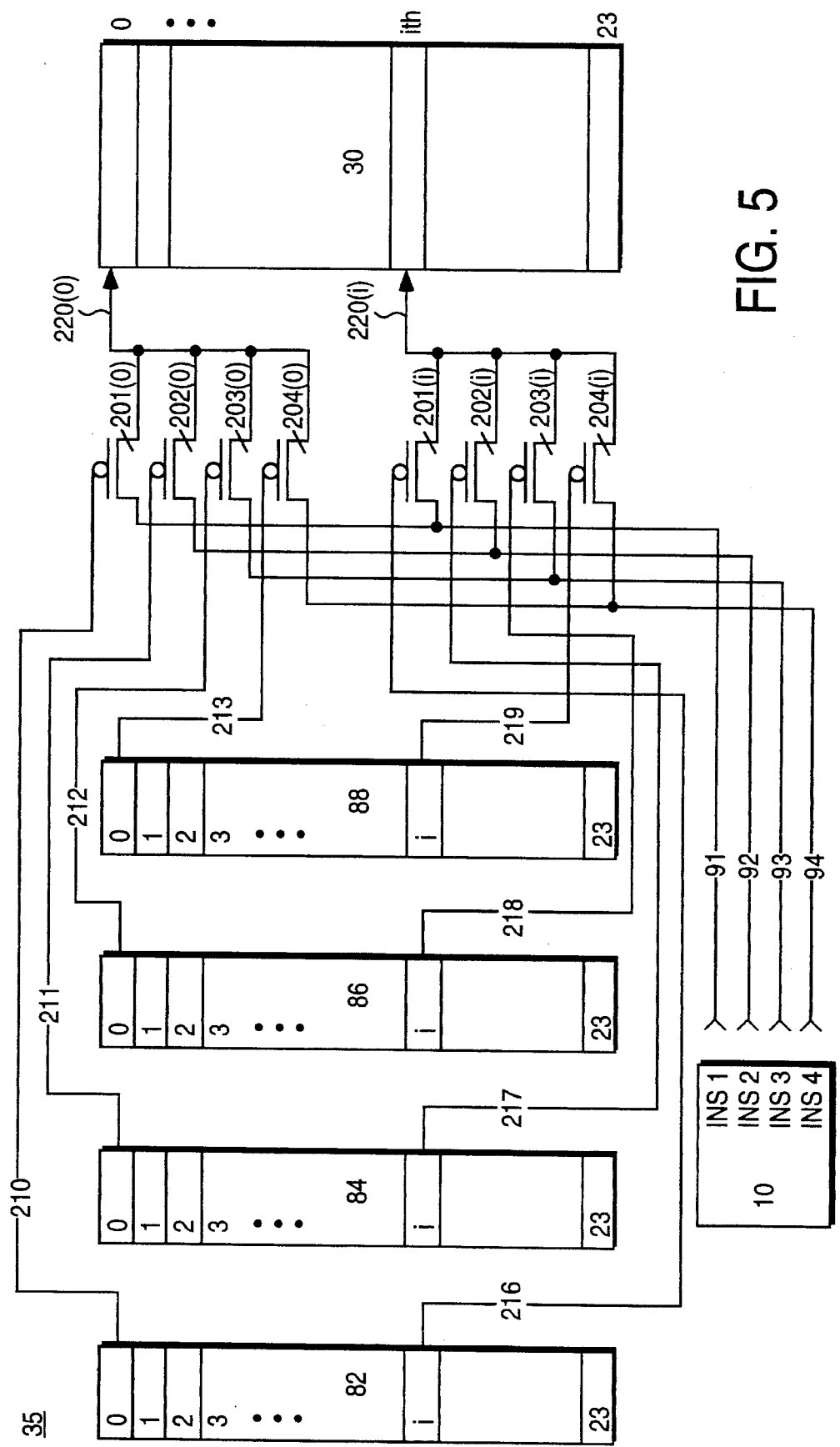
FIG. 5 illustrates coupling of the present invention between the four enable vectors, the reservation station memory and the instruction decoder.

Refer to FIG. 5 which illustrates the circuitry of the present invention that enables the reservation station 30 to accept the instructions and associated information that are issued by the microprocessor 101 and sent from the instruction decoder 10. The circuits of FIG. 5 enable any one of the instructions presented at lines 91–94 to be routed to any of the 24 entries of the reservation station 30 depending on those indicated as vacant by the deallocation vector 40. Each of the 24 bit enable vectors 82, 84, 86, and 88 are coupled to the reservation station 30 via four sets of 24 enable pass gates. For any given instruction, there are 24 different pass gates which will couple that instruction to one of the entries of the reservation station 30. Each instruction 1–4 has a separate enable vector 82, 84, 86, or 88 which will act to couple the instruction to the reservation station. Enable vector 82 couples instruction 1, enable vector 84 couples instruction 2, enable vector 86 coupled instruction 3 and enable vector 88 couples instruction 4. It is appreciated that the enable circuitry of FIG. 5 may be located within the reservation station in the preferred embodiment of the present invention. In other embodiments of the present invention, the enable circuitry of FIG. 5, except for reservation station 30 and the instruction decoder 10, are located within the allocation circuit 35.

The total circuitry of the present invention required to perform the enable function of the reservation station 30 is complex because there are 24 separate, but similar stages. In the interests of clarity, the circuitry of the present invention associated with the first entry of each of the vectors and the $i^{th}$ entry of each of the vectors is illustrated in FIG. 5. Each of the other 24 entries will be the same as those illustrated, therefore, the circuitry for each entry is not illustrated in detail as to not obscure the present invention. FIG. 5 illustrates that the instruction decoder 10 presents instructions and instruction information on the four lines 91 to 94. Instruction 1 is placed over line 91 and enabled by vector 82, instruction 2 over line 92 and enabled by vector 84, instruction 3 over line 93 and enabled by vector 86 and lastly instruction 4 over line 94 and enabled by vector 88.

Entry 0 for each of the enable vectors 82, 84, 86, and 88 are coupled to the enable pins of a set of four pass gates. The bit of entry 0 of enable vector 82 is coupled to the enable pin of pass gate 201(0) via line 210. The bit of entry 0 of enable vector 84 is coupled to the enable pin of pass gate 202(0) via line 211. The bit of entry 0 of enable vector 86 is coupled to the enable pin of pass gate 203(0) via line 212. The bit of entry 0 of enable vector 88 is coupled to the enable pin of pass gate 204(0) via line 213. The data flow pin 91 associated with instruction 1 is communicatively coupled to the instruction decoder 10 (actually, the instruction decoder sends instructions to a Register Alias Table "RAT" first which then forwards the instructions to the reservation station, however the operation of the RAT is not pertinent to the understanding of the present invention) and to the input of pass gate 201(0). Line 92 carries instruction 2 and is coupled to the instruction decoder 10 and to the input of pass gate 202(0). The data flow pin 93 associated with instruction 3 is coupled to the instruction decoder 10 and to the input of pass gate 203(0). Line 94 carries instruction 4 and is coupled to the instruction decoder 10 and to the input of pass gate 204(0). The outputs of each of the pass gates 201(0), 202(0), 203(0), and 204(0) are coupled to entry 0 of the reservation station 30 via the single line 220(0). When an entry within the enable vectors is active, that is, carries a 1, it will active the associated pass gate to couple the input and the output lines together and allow instruction information to flow into the reservation station 30. When disabled, i.e., a 0 is present in a particular entry, the pass gate will not couple the instruction data to the reservation station. It is appreciated that within the present invention the pass gates may be implemented utilizing multiported memory cell arrays.

Only one of the pass gates of these first set of four can be activated at any one time because only one entry 0 of the enable vectors 82, 84, 86, and 88 will be active at any time. Depending on the active pass gate of these four, if any, an instruction (1–4) and its associated data will be routed from the instruction decoder 10 into the 100–200 bit entry of the reservation station 30. It is appreciated that for each of the 24 entries of the enable vectors, the above circuitry and set of four enable pass gates ($201(i)$–$204(i)$) is present to allow all 24 entries of the reservation station 30 to accept instruction information. Entry 0 of vector 82 routes instruction 1, entry 0 of vector 84 routes instruction 2, entry 0 of vector 86 routes instruction 3 and entry 0 of vector 88 routes instruction 4.

For clarity, the coupling required for the $i^{th}$ entry of the enable vectors and reservation station is illustrated in FIG. 5. It is appreciated that the circuitry for this $i^{th}$ entry is duplicated for all 24 entries of the present invention. Each $i^{th}$ entry of vector 82 is coupled by a line 216 to an enable pin of a pass gate 201($i$) which receives an input from the instruction decoder 10 for instruction 1 (over line 91) and has an output coupled to a line 220($i$) which couples instruction 1 into the $i^{th}$ entry of the reservation station 30. Each entry of enable vector 84 is coupled. Each $i^{th}$ entry of vector 84 is coupled by a line 217 to an enable pin of a pass gate 202($i$) which receives an input from the instruction decoder 10 for instruction 2 (over line 92) and has an output coupled to a line 220($i$) which couples instruction 2 into the $i^{th}$ entry of the reservation station 30. Each $i^{th}$ entry of vector 86 is coupled by a line 218 to an enable pin of a pass gate 203($i$) which receives an input from the instruction decoder 10 for instruction 3 (over line 93) and has an output coupled to a line 220($i$) which couples instruction 3 into the $i^{th}$ entry of the reservation station 30. Lastly, each $i^{th}$ entry of vector 88 is coupled by a line 219 to an enable pin of a pass gate 204($i$) which receives an input from the instruction decoder 10 for instruction 4 (over line 94) and has an output coupled to a line 220($i$) which couples instruction 4 into the $i^{th}$ entry of the reservation station 30.

It is appreciated that since each of the enable vectors 82, 84, 86 and 88 is created simultaneously, they are simultaneously applied to the pass gate network (containing pass gates 201($i$), 202($i$), 203($i$), and 204($i$)). Therefore, the four instructions 1–4 are simultaneously applied from the instruction decoder 10 to the four vacant entries of the reservation station 30 as indicated by the four enable vectors.

An example configuration of the enable vectors is given. Assuming that the highest priority enable vector 82 entry 2 had a one, enable vector 84 entry 6 had a one, enable vector 86 entry 10 had a one and the lowest priority enable vector 88 entry 20 had a one. Entry 2 of vector 82 would enable instruction 1 to be fed into entry 2 of the reservation station via a pass gate 201(2) and line 220(2). Entry 6 of enable vector 84 would feed instruction 2 into entry 6 of the reservation station 30 via a pass gate 202(6). Entry 10 of enable vector 86 will feed instruction 3 into entry 10 of the reservation station 30 via a pass gate 203(10). And lastly, entry 20 of enable vector 88 will feed instruction 4 from the instruction decoder 10 into entry 20 of the reservation station 30 via a pass gate 204(20). The above will happen simultaneously as each of the enable vectors are created at the same time and will be applied to the pass gate network at the same instant in time.

Updating the Deallocation Vector

Once write enable vectors 82, 84, 86, and 88 have been determined by the present invention, the deallocation vector 40 is updated to remove the 1s from the four entries marked by the enable vectors. Each enable vector 82, 84, 86, 88 is analyzed in the present invention in order to determine which entry is set to 1. The corresponding entry in the deallocation vector 40 is then toggled to change from a 1 to a zero. This can rapidly be done by coupling each entry of all four enable vectors to the entries of the deallocation vector 40. Those entries in the enable vectors having a 1 will act to toggle the corresponding entries within the deallocation vector 40.

During the same clock cycle period as the present invention allocation circuit 35 is operating, previously stored instructions within the reservation station 30 are completing their execution cycles and are fed to the execution units 50$a$–50$c$. Once a particular instruction is fed to the execution units and removed from the reservation station 30, the entry in which it occupied may become vacant. Therefore, instructions are tracked which have been output from the instruction scheduler 20 and their entries are marked as vacant within the deallocation vector by placing a 1 within the corresponding entry. For any given clock cycle, the present invention will be determining which of the highest priority entries within the deallocation vector are vacant, storing instructions into those entries, marking those entry as full, and then marking other previously stored entries as vacant as their associated instructions leave the instruction scheduler.

Processing Flow of the Static Implementation

Figure 6:
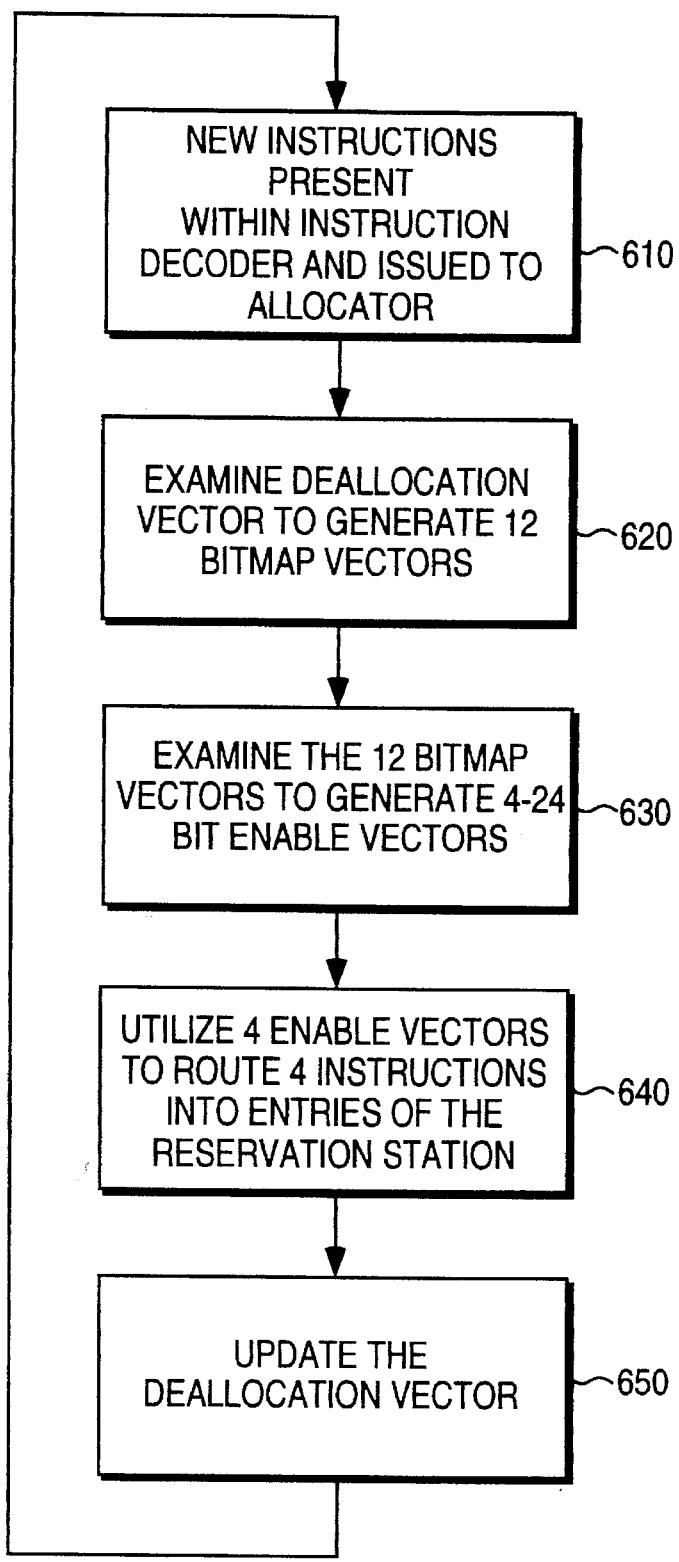
FIG. 6 illustrates the major processing tasks performed by the allocation circuit 35 of the present invention.

In summary, the static embodiment of the present invention operates to perform the following tasks as illustrated in the flow diagram of FIG. 6. FIG. 6 illustrates the major processing tasks performed by the allocation circuit 35 of the present invention. New instructions are issued by the microprocessor 101 at block 610. Typically there are up to four new instructions issued by the microprocessor via the instruction decoder at block 610. The present invention must find entries within the reservation station 30 for these instructions. The present invention, at block 620, first examines the deallocation vector 40, in the manner described above, to generate twelve 8-bit bitmap vectors based on the number and placement of the 1s located within the deallocation vector. The input to block 620 is the deallocation vector 40 and the output of block 620 are the twelve bitmap vectors 300–311. Block 620 operates within 4 nanoseconds. The 12 twelve bitmap vectors are generated in sequence, set of three is generated simultaneously and four of such sets are generated in rapid sequence. It is appreciated that block 620 of the present invention is accomplished via logical conditions (of Tables 1–4) that are implemented in transistor logic.

Next, at block 630 the dynamic multiplexing of the present invention is done; the present invention examines the twelve bitmap vectors and generates therefrom, using a multiplexing circuit in the manner described above, four 24-bit enable vectors 82, 84, 86, and 88. Each of the enable vectors will have only one bit set of the 24 entries. Block 630 operates within 1.1 nanoseconds. The input of block 630 of the present invention are the twelve 8-bit bitmap vectors and the output of block 630 are the four 24-bit enable vectors. The four enable vectors are generated by the present invention simultaneously according to the multiplexing conditions. It is appreciated that block 630 of the present invention is accomplished via logical conditions (of Table 5) that are implemented in transistor logic.

Referring to FIG. 6, at block 640, the present invention applies the four 24 bit vectors to a pass gate network that routes the four instructions into four vacancies of the reservation station as indicated by the four enable vectors. Each enable vector is responsible for directing a particular instruction to an entry within the reservation station. The input to block 640 are the four enable vectors and the output of this block is the passage of the instructions into the reservation station. At block 650 the deallocation vector is updated by toggling to zero those entries that are used by the enable vectors to hold the new instruction data. At the same time, the reservation station marks as vacant those entries that correspond to instructions that have been sent to the execution units from the instruction scheduler. The processing of the flows from block 610 to block 650 occurs within one clock cycle. At the start of the next clock cycle the present invention returns to block 610 to start the cycle once more for a new set of instructions and an updated deallocation vector.

It is appreciated that the circuits of the static embodiment are realized using Bi-CMOS technology.

II. Substantially Dynamic Embodiment Implementation

The present invention is also implemented via a substantially dynamic embodiment. This embodiment is called dynamic in so far as this embodiment utilizes dynamic CMOS circuit design techniques. Within this embodiment, there are four distinct stages of the invention that operate in series fashion. This process of the present invention takes the deallocation vector 40 and generates 4 enable vectors, one for each instruction. Each of these enable vectors is 24 bits wide and can have only one entry set for a "1." The "1" directly activates the write enable of the reservation station entry which allows all information pertaining to that instruction to be written into the reservation station. This portion of the dynamic implementation is identicle to the static implementation.

Figure 7:
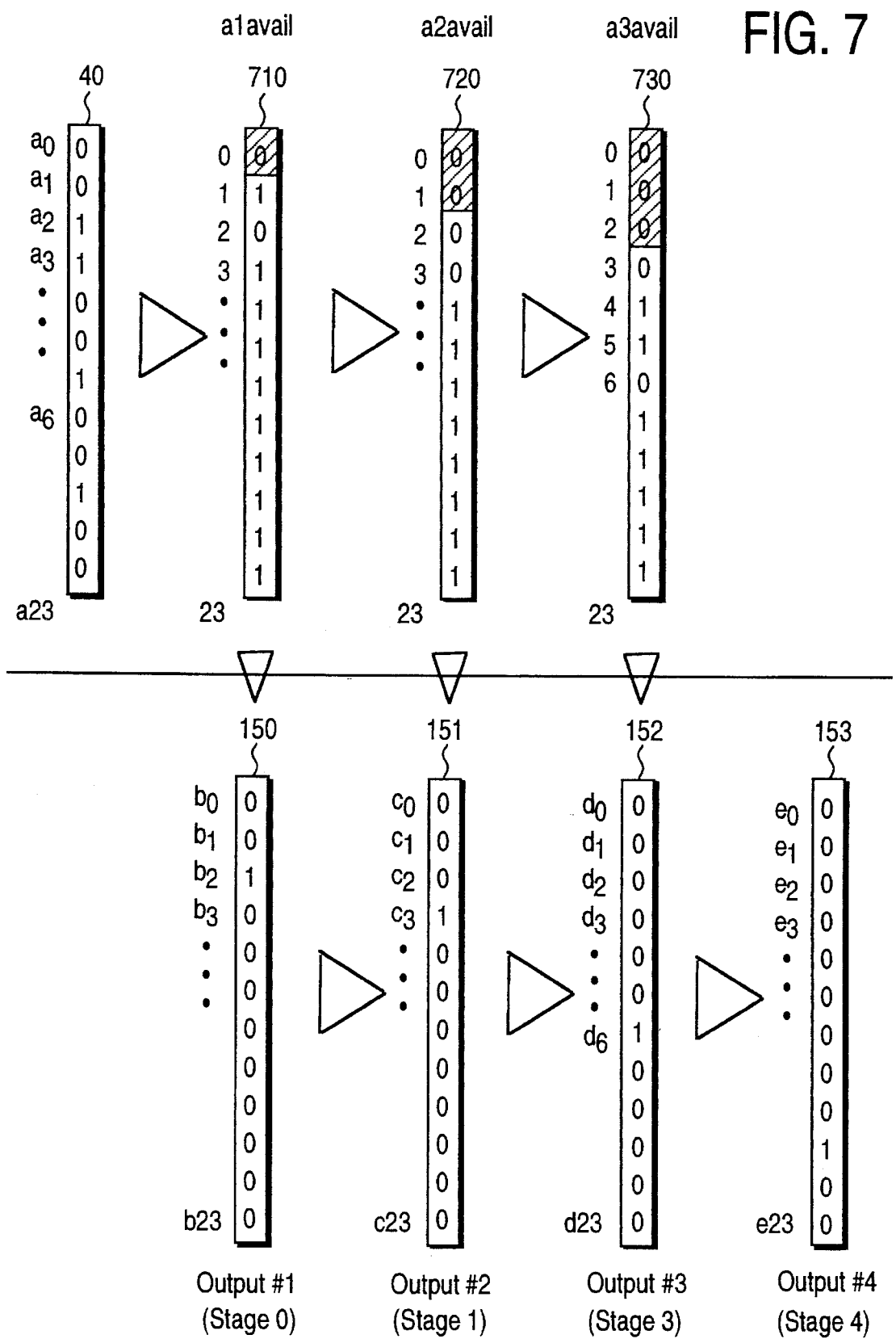
FIG. 7 illustrates the processing stages of the dynamic implementation of the present invention.

FIG. 7 illustrates the overall process flow of the fully dynamic embodiment of the present invention. It is appreciated that FIG. 7 specifically identifies the input and output labels used in the detailed circuit of FIG. 8A and FIG. 8B. A sample deallocation vector 40 is given illustrating four "1s" within the vector. The 24 entries of the deallocation vector 40 are labeled a0 to a23. According to the flow of FIG. 7, the present invention at the first stage, scans the deallocation vector 40 for a first priority "1." Priority is determined based on the entry number of the vector, where 0 is the highest and 23 the lowest, however, any priority scheme could be adopted within the scope of the present invention (i.e., where entry 23 is the highest priority and 0 the lowest, or where 0–11 are taken and then 12–23, etc.). Upon locating the first priority one, the present invention at the first stage outputs enable vector 150 having a 1 set corresponding to the entry number of the highest priority 1 of the deallocation vector 40 and zeros elsewhere for the other 23 entries. This is the "b" output vector. The enable vector 150 corresponds to the 24 outputs b0 to b23 of the circuits of FIG. 8A and FIG. 8B. Also, at the first stage, avail_1 outputs are generated which are found in vector 710 of FIG. 7. Entries of the avail_1 vector are called a1avail1 (note a0avail1 would not be generated because this bit would not be sent to the ) to a23avail1.

These outputs indicate the entries of the deallocation vector that are available to the subsequent stages of the present invention searching process; an entry is available (whether or not it is a "1" or a "0") if it has not yet been selected by an enable vector. In other words, the available vectors (710, 720, 730) indicate those entries that were not yet selected by a higher priority enable vector (150, 151, 152, 153). For instance, the avail_1 vector 710 indicates that all the entries of the deallocation vector are available ("1") to the second stage processing except 1) the entry (a3) that corresponds to the highest priority "1" found and 2) the first entry (a0) of the deallocation vector 40 can never be available for the second stage because the first stage would have taken it.

It is appreciated that there is not a signal a0avail1 generated because this bit a0 is never available for the second stage processing for output1 enables. It a0 is set, it would be taken by the first stage. The signal a1avail1 indicates that bit 1 was not set in the first stage enable vector. This could mean that bit 0 was set (a0=1) or that the a1 bit was a zero.

At the second stage processing the present invention dynamic embodiment searches for the next highest priority "1" of the deallocation vector and generates enable vector 151 based on this entry. At the second stage, the avail_2 vector 720 is generated that indicates the entries of the original deallocation vector that are available to the third processing stage. Entries 0 and 1 of the avail_2 vector 720 are not available to the third state since the first or the second stage would have taken them. Entries of the avail_2 vector are called a0avail2 to a23avail2. Also, the first two highest priority "1s" found in the first and second stage will not be available to the third processing and they are marked as not available in the 720 vector. The second stage outputs vector 151 as the second enable vectors. Entries c0 to c23 make up the 24 entries of this enable vector and correspond to the outputs of FIG. 8A and FIG. 8B.

At the third stage of processing of the present invention, the third enable vector 152 is generated and holds the third priority "1" located within the deallocation vector 40. Enable vector 152 is composed of 24 entries labeled d0 to d23. An avail_3 vector 730 indicates which entries of the deallocation 40 are available for the fourth and last processing stage of the present invention. Entries of the avail_3 vector are called a0avail3 to a23avail3. The avail_3 vector will indicate that the first three priority "1s" are not available and also that the first three entries are not available to the enable vector 153 (generated by the fourth stage). Lastly, the enable vector 153 is generated by the fourth stage of the present invention wherein the deallocation vector is scanned to locate the fourth priority "1" of the 24 entries. The enable vector 153 is composed of 24 entries e0 to e23. There are no subsequent scanning stages of the present invention past the fourth stage so no available vector is generated as a result of the fourth stage.

Therefore according to FIG. 7, the present invention dynamic embodiment contains four stages that are operated in sequence. The first stage generates the first enable vector 150 and an avail_710 vector which is used by the second stage to indicate those entries of the deallocation vector 40 still available. The second stage generates enable vector 151 and also an avail_2 vector 720 to indicate to the third stage which entries of the deallocation vector 40 are yet available for selection. The third stage generates enable vector 152 and a last available vector avail_3 730 which indicates to the last stage which entries of the deallocation vector 40 have not been selected and are therefore available. The last processing stage then generates the last enable vector 153. As the static embodiment, the enable vectors of the dynamic embodiment are coupled as shown in FIG. 5 with regard to the enable vectors 82, 84, 86, and 88 respectively, to control information access into the reservation station 30 for the current four instructions. Enable vector 150 is coupled as vector 82, vector 151 is coupled as vector 84, vector 152 is coupled as vector 86 and vector 153 is coupled as vector 88.

Figure 8A:
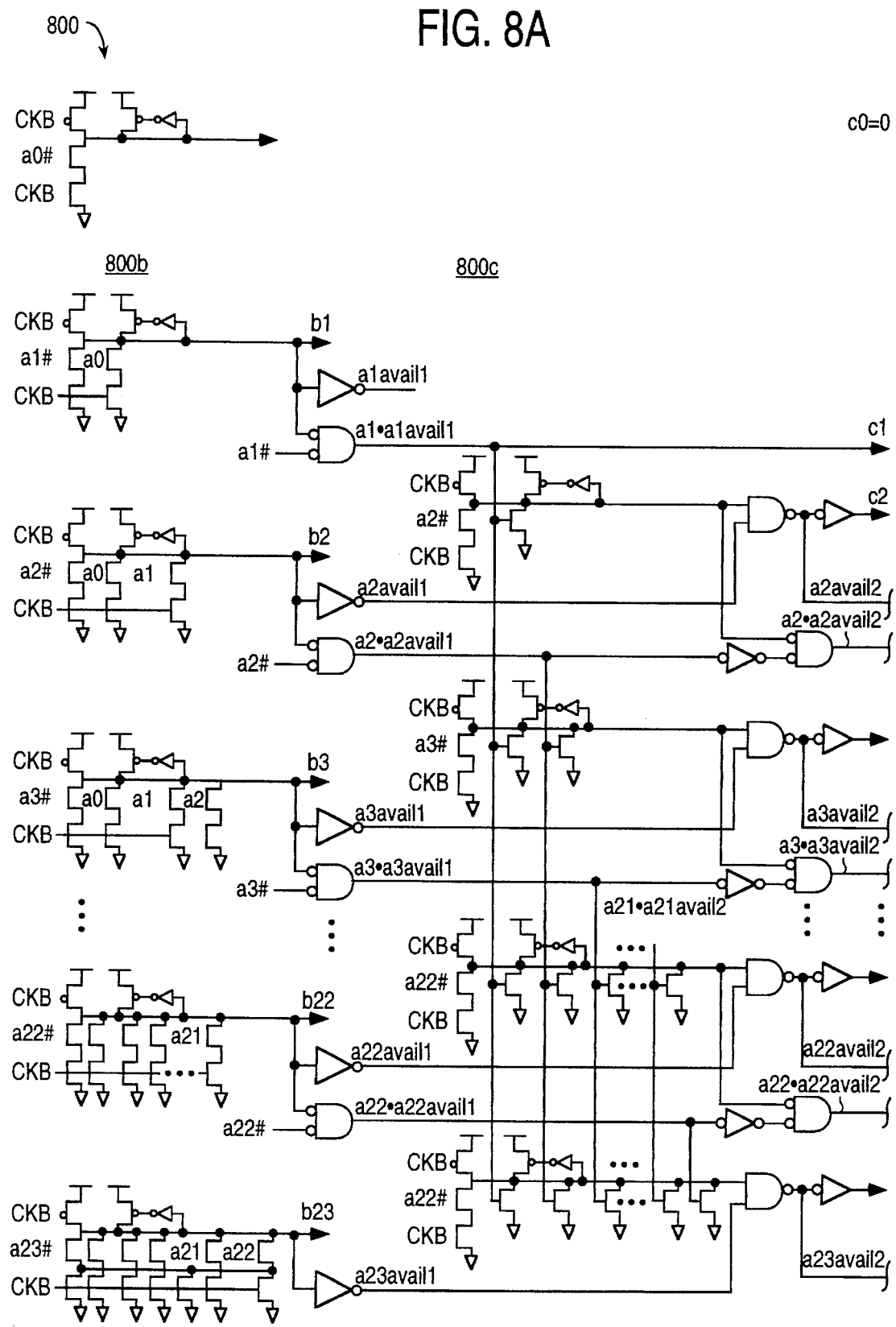
FIG. 8A and FIG. 8B illustrate the circuitry implemented by the present invention to realize the dynamic embodiment of the present invention.
Figure 8B:
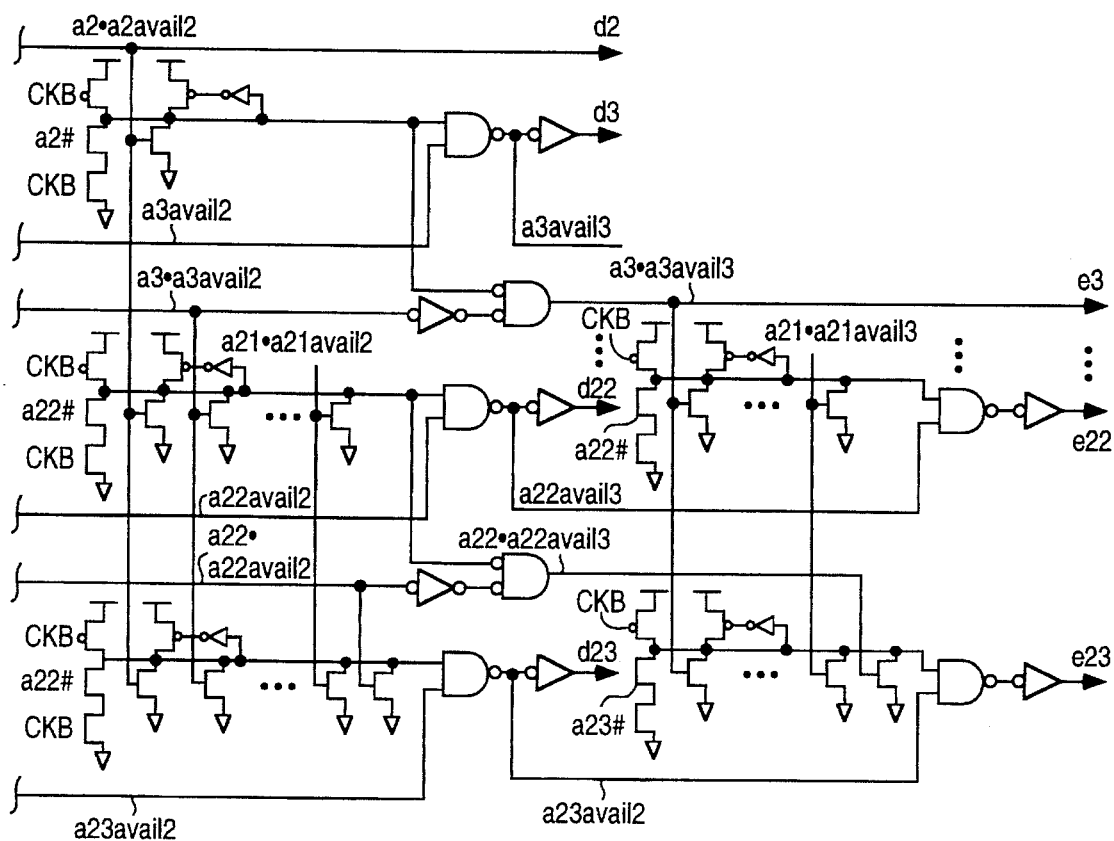

The specific and detailed implementation of the circuitry 800 of the dynamic embodiment of the present invention is illustrated in FIG. 8A and FIG. 8B. The logic utilized by the dynamic embodiment as shown in Bi-CMOS technology. The entire circuitry of the dynamic embodiment is very complex and functionally redundant in many places. FIGS. 8A and 8B illustrate the major circuit and logic stages of the this embodiment in a form that can be understood and replicated in the areas illustrated in order to generate the repeating circuitry. The reduced circuit logic of FIGS. 8A and 8B is presented for clarity. It is appreciated that given the circuitry plan of FIGS. 8A and 8B and the related discussions, the entire circuit of the dynamic embodiment of the present invention can easily be realized. The first stage of the dynamic implementation is 800b, the second stage is 800c, the third stage is 800d, and the final stage of the dynamic embodiment is 800e. The circuit notation "#" refers to the inverse of the signal indicated and "ckB" indicates the clock pulse used to generate the functions of the dynamic embodiment of the present invention (which is the same as the ck# designation).

Referring to FIG. 8A, stage 800b inputs the 24 entries (and inverses) of the deallocation vector labeled a0 to a23 and the clock pulse. Stage 800b, as shown, outputs the first enable vector 150 as outputs b0 to b23. Stage 800b also outputs the first avail_1 vector 720 as outputs a0avail1–a23avail1. The second stage 800c inputs the avail_1 vector 720 and the clock to output the second enable vector 151 composed of outputs b0 to b23. The second stage 800c outputs the second available vector a2avail2 to a23avail2. These outputs are then coupled to the inputs of the third stage 800d shown in FIG. 8B as well as the clock. The third stage 800d outputs the entries d0 to d23 of the third enable vector 152 as well as the third available vector 730 composed of entries a3avail3–a23avail3 to the last stage. The four and last stage 800e inputs the third available vector 730 and the clock and generates therefrom the last enable vector 153 composed of entries e0 to e23. Due to the coupling of the stages, the dynamic embodiments operates in sequence with the first, second, third and last stage operating respectively to generate the enable vectors 150, 151, 152 and 153 in sequence.

After the four enable vectors 150–153 are generated, the dynamic embodiment then enables the corresponding entries of the reservation station and updates the deallocation vector 40 to reflect that the selected entries of the enable vectors are allocated. It is appreciated that sections of the static embodiment of the present invention are analogous to the dynamic embodiment of the present invention unless specifically differentiated herein.

It is appreciated that the logic utilized within the embodiment of the present invention illustrated in FIG. 8A and FIG. 8B is listed in the Appendix. According to this listing the values B[0] to B[23] represent the stage0 output vector of FIG. 7. Values C[0] to C[23] represent the stage1 output vector of FIG. 7. Values D[0] to D[23] represent the stage2 output vector of FIG. 7. And, values E[0] to E[23] represent the last stage, or stage3, output vector of FIG. 7. The logic implemented by the Appendix is one illustration of the present invention and the present invention should not be construed as limited by this particular embodiment as several variations of the particular logic utilized within an embodiment of the present invention would remain within the spirit and scope of the present invention.

The preferred embodiment of the present invention, a system for rapidly discovering the first set of a pattern of vacancy indicators within a deallocation vector, is thus described. While the present invention has been described in particular embodiments, it should be appreciated that the present invention should not be construed as limited by such embodiments, but rather construed according to the below claims.

APPENDIX

B[0]  := A[0];

B[1]  := (NOT A[0]) AND A[1];

APPENDIX-continued

```
              a1avail1 := NOT B[1];
              a1.a1avail1 := A[1] AND a1avail1;

B[2]       := (NOT a[0]) AND (NOT A[1]) AND A[2];

a2avail1 := NOT B[2]);
              a2.a2avail1 := A[2] AND a2avail1;

B[3]       := (NOT A[0]) AND (NOT A[1]) AND (NOT A[2]) AND A[3];

a3.avail1 := NOT B[3];
              a3.a3avail1 := A[3] AND a3avail1;

B[4]       := (NOT A[0]) AND (NOT A[1]) AND (NOT A[2]) AND (NOT A[3]) AND A[4];

a4.avail1 := NOT B[4];
              a4.a4avail1 := A[4] AND a4avail1;

B[5]       := (NOT A[0]) AND (NOT A[1]) AND (NOT A[2]) AND (NOT A[3]) AND (NOT A[4])
              AND A[5];

a5avail1 := NOT B[5];
              a5.avail1 := A[5] AND a5avail1;

B[6]       := (NOT A[0]) AND (NOT A[1]) AND (NOT A[2]) AND (NOT A[3]) AND (NOT A[4])
              AND (NOT A[5]) AND A[6];

a6avail := NOT B[6];
              a6.a6avail := A[6] AND a6avail];

B[7]       := (NOT A[0]) AND (NOT A[1]) AND (NOT A[2]) AND (NOT A[3]) AND (NOT A[4])
              AND (NOT A[5]) AND (NOT A[6]) AND A[7];

a7avail1 := NOT B[7];
              a7.a7avail1 := A[7] AND a7avail1;

B[8]       := (NOT A[0]) AND (NOT A[1]) AND (NOT A[2]) AND (NOT A[3]) AND (NOT A[4])
              AND (NOT A[5]) AND (NOT A[6]) AND (NOT A[7]) AND A[8];

a8avail1 := NOT B[8];
              a8.a8avail1 := A[8] AND a8avail1;

B[9]       := (NOT A[0]) AND (NOT A[1]) AND (NOT A[2]) AND (NOT A[3]) AND (NOT A[4])
              AND (NOT A[5]) AND (NOT A[6]) AND (NOT A[7]) AND (NOT A[8]) AND A[9];

a9avail1 := NOT B[9];
              a9.a9avail1 := A[9] AND a9avail1;

B[10]      := (NOT A[0]) AND (NOT A[1]) AND (NOT A[2]) AND (NOT A[3]) AND (NOT A[4])
              AND (NOT A[5]) AND (NOT A[6]) AND (NOT A[7]) AND (NOT A[8]) AND
              (NOT [9]) AND A[10];

a10avail := NOT B[10];
              a10.a10avail := A[10] AND a10avail1;

B[11]      := (NOT A[0]) AND (NOT A[1]) AND (NOT A[2]) AND (NOT A[3]) AND (NOT A[4])
              AND (NOT A[5]) AND (NOT A[6]) AND (NOT A[7]) AND (NOT A[8]) AND
              (NOT [9]) AND (NOT A[10]) AND A[11];

a11avail := NOT B[11];
              a11.a11avail := A[11] AND a10avail1;

B[23]      := NOT A[0]) AND (NOT A[1]) AND (NOT A[2]) AND (NOT A[3]) AND (NOT A[4])
              AND (NOT A[5]) AND (NOT A[6]) AND (NOT A[7]) AND
              . . . AND (NOT A[22]) AND A[23];

a23avail1 := NOT B[23];

C[0]       := 0;

C[1]       := a1.a1avail1;

C[2]       := (NOT a1.a1avail1;) AND a2avail1 AND A[2];

a2avail2 := NOT C[2];
              a2.a2avail2 := (a1.a1avail1) OR A[2]) AND a2.a2avail1;

C[3]       := (NOT a1.a1avail1) AND (NOT a2.a2avail1) AND a3avail1 AND A[3];
```

APPENDIX-continued

```
               a3avail2 := NOT C[3];
               a3.a3avail2 := (a1.a1avail1 OR a2.a2avail1 OR NOT A[3]) AND a3.a3avail1;

C[4]        := (NOT a1.a1avail1) AND (NOT a2.a2avail1) AND (NOT a3.a3avail1) AND a4avail1
               AND A[4];

a4avail2 := NOT C[4];
               a4.a4avail2 := a1.a1avail1 OR a2.a2avail OR a3.avail1 OR NOT
                              A[4]) AND a4.a4avail1;

C[5]        := (NOT a1.a1avail1) AND (NOT a2.a2avail1) AND (NOT a3.avail1) AND
               (NOT a4.a4avail1) AND a5avail1 AND A[5];

a5avail2 := NOT C[5];
               a5.a4avail2 := (a1.a1avail1 OR a2.a2avail1 OR a3.a3avail1 OR
                              a4.a4avail1 OR NOT A[5]) AND a5.a5avail1;

C[6]        := (NOT a1.a1avail1) AND (NOT a2.a2avail1) AND (NOT a3.a3avail) AND
               (NOT a4.a4avail1) AND (NOT a5.a5avail1) AND a6avail1 AND A[6];

a6avail2 := NOT C[6];
               a6.a6avail2 := (a1.a1avail1 OR a2.a2avail1 OR a3.a3avail1 OR
                              a4.a4avail1 OR a5.a5avail1 OR NOT A[5] AND a6.a6avail;

C[7]        := (NOT a1.a1avail1) AND (NOT a2.a2avail1) AND (NOT 3.a3avail1) AND
               (NOT a4.a4avail1) AND (NOT a5.a5avail1) AND (NOT a6.a6avail1) AND a7avail1
               AND A[7];

a7avail2 := NOT C[7];
               a7.a7avail2 := a1.a1avail1 OR a2.a2avail1 OR a3.a3avail1 OR a4.a4avail1 OR
                              a5.a5avail1 OR a6.a6avail1 OR NOT A[5] AND a7.a7avail1;

C[8]        := (NOT a1.a1avail1) AND (NOT a2.a2avail1) AND (NOT a3.a3avail1) AND
               (NOT a4.a4avail1) AND (NOT a5.a5avail1) AND (NOT a6.a6avail1) AND
               (NOT a7.a7avail1) AND a8avail1 AND A[8];

a8avail2 := NOT C[8];
               a8.a8avail2 := (a1.a1avail1 OR a2.a2avail1 OR a3.a3avail1 OR a4.a4avail1 OR
                              a5.a5avail1 OR a6.a6avail1 OR a7.a7avail1 OR NOT A[5])
                              AND a8.a8avail1;

C[9]        := (NOT a1.a1avail1) AND (NOT a2.a2avail1) AND (NOT a3.a3avail1) AND
               (NOT a4.a4avail1) AND (NOT a5.a5avail1) AND (NOT a6.a6avail1) AND
               (NOT a7.a7avail1) AND (NOT a8.a8avail1) AND a9avail1 AND A[9];

a9avail2 := NOT C[9];
               a9.a9avail2 := a1.a1avail1 OR a2.a2avail1 OR a3.a3avail1 OR a4.a4avail1 OR
                              a5.a5avail1 OR a6.a6avail1 OR a7.a7avail1 OR a8.a8avail1
                              NOT A[5]) AND a9.a9avail1;

C[10]       := (NOT a1.a1avail1) AND (NOT a2.a2avail1) AND
               (NOT a3.a3avail1) AND (NOT a4.a4avail1) AND
               (NOT a5.a5avail1) AND (NOT a6.a6avail1) AND
               (NOT a7.a7avail1) AND (NOT a8.a8avail1) AND
               (NOT a9.a9avail1) AND a10avail1 AND A[10];

a10avail2 := NOT C[10];
               a10.a10avail2 := (a1.a1avail1 OR a2.a2avail1 OR a3.a3avail1 OR a4.a4avail1 OR
                                a5.a5avail1 OR a6.a6avail1 OR a7.a7avail1 OR a8.a8avail1 OR
                                a9.a9avail1 OR NOT A[5]) AND a10.a10avail1;

C[11]       := (NOT a1.a1avail1) AND (NOT a2.a2avail1) AND (NOT a3.a3avail1) AND
               (NOT a4.a4avail1) AND (NOT a5.a5avail1) AND (NOT a6.a6avail1) AND
               (NOT a7.a7avail1) AND (NOT a8.a8avail1) AND (NOT a9.a9avail1) AND
               (NOT a10.a10avail1) AND A[11];

a11avail2 := NOT C[11];
               a11.a11avail2 := (a1.a1avail1 OR a2.a2avail1 OR a3.a3avail1 OR a4.a4avail1 OR
                                a5.a5avail1 OR a6.a6avail1 OR a7.a7avail1 OR a8.a8avail1 OR
                                a9.a9avail1 OR a10.a10avail1 or NOT A[5]) AND a10.a10avail1;
. . .
. . .

C[23]       := (NOT a1.a1avail1) AND (NOT a2.a2avail1) AND
               (NOT a3.a3avail1) AND
               . . . (NOT a22.a22avail1) AND a23avail AND A[23];
```

APPENDIX-continued

```
                    a23avail2 := NOT C[23];

D[0]         :=     0;

D[1]         :=     0;

D[2]         :=     a2.a2avail2;

D[3]         :=     (NOT a2.a2avail2) AND A[3] AND a3avail2;

a3avail3 := NOT D[3];
                    a3.a3avail3 := (a2.a2avail2 OR NOT A[3]) AND a3.a3avail2;

D[4]         :=     (NOT a2.a2avail2) AND (not a3.a3avail2) AND A[4] AND a4avail2;

a4avail3 := NOT D[4];
                    a4.a4avail3 := (a2.a2avail2 OR a3.a3avail2 NOT A[3]) AND
                                a4.a4avail2;

D[5]         :=     (NOT a2.a2avail2) AND (not a3.a3avail2) AND (NOT a4.a4avail2) AND A[5]
                    AND a5avail2;

a5avail3 := NOT D[5];
                    a5.a5avail3 := (a2.a2avail2 OR a3.a3avail2 OR a4.a4avail2 NOT A[3]) AND
                                a5.a5avail2;

D[6]         :=     (NOT a2.a2avail2) AND (NOT a3.a3avail2) AND (NOT a4.a4avail2) AND NOT
                    a5.a5avail2) AND A[6] and a6avail2;

a6avail3 := NOT D[6];
                    a6.a6avail3 := (a2.a2avail2 OR a3.a3avail2 OR a4.a4avail2 OR a5.a5avail2 OR NOT
                                A[3]) AND a6.a6avail2;

D[7]         :=     (NOT a2.a2avail2) AND (NOT a3.a3avail2) AND (NOT a4.a4avail2) AND
                    (NOT a5.a5avail2) AND (NOT a6.a6avail2) AND A[7] and A7avail2;

a7avail3 := NOT D[7];
                    a7.a7avail3 := (a2.a2avail2 OR a3.a3avail2 OR a4.a4avail2 OR a5.a5avail2 OR
                                a6.a6avail2 OR NOT A[3] AND a7.a7avail2;

D[8]         :=     (NOT a2.a2avail2) AND (NOT a3.a3avail2) AND (NOT a4.a4avail2) AND
                    (NOT a5.a5avail2) AND (NOT a6.a6avail2) AND (NOT a7.a7avail2) AND A[8]
                    ANDA8avail2;

a8avail3 := NOT D[8];
                    a8.a8avail3 := (a2.a2avail2 OR a3.a3avail2 OR a4.a4avail2 OR a5.a5avail2 OR
                                a6.a6avail2 OR a7.a7avail2 OR NOT A[3]) AND a8.a8avail2;

D[9]         :=     (NOT a2.a2avail2) AND (NOT a3.a3avail2) AND (NOT a4.a4avail2) AND
                    (NOT a5.a5avail2) AND (NOT a6.a6avail2) AND (NOT a7.a7avail2) AND
                    (NOT a8.a8avail2) AND A[9] and A9avail2;

a9avail3 := NOT D[9];
                    a9.a9avail3 := (a2.a2avail2 OR a3.a3avail2 OR a4.a4avail2 OR a5.a5avail2 OR
                                a6.a6avail2 OR a7.a7avail2 OR a8.a8avail2 OR NOT A[3]) AND
                                a9.a9avail2;

D[10]        :=     (NOT a2.a2avail2) AND (NOT a3.a3avail2) AND (NOT a4.a4avail2) AND
                    (NOT a5.a5avail2) AND (NOT a6.a6avail2) AND (NOT a7.a7avail2) AND
                    (NOT a8.a8avail2) AND (NOT a9.a9avail2) AND A[10] AND A10avail2;

a10avail3 := NOT D[10];
                    a10.a10avail3 := (a2.a2avail2 OR a3.a3avail2 OR a4.a4avail2 OR a5.a5avail2 OR
                                a6.a6avail2 OR a7.a7avail2 OR a8.a8avail2 OR a9.a9avail2 OR NOT
                                A[3]) AND a10.a10avail2;

D[11]        :=     (NOT a2.a2avail2) AND (NOT a3.a3avail2) AND (NOT a4.a4avail2) AND
                    (NOT a5.a5avail2) AND (NOT a6.a6avail2) AND (NOT a7.a7avail2) AND
                    (NOT a8.a8avail2) AND (NOT a9.a9avail2) AND (NOT a10.10avail2) AND A[11]
                    AND A11avail2;

a11avail3 := NOT D[11];
                    a11.a11avail3 := (a2.a2avail2 OR a3.a3avail2 OR a4.a4avail2 OR a5.a5avail2 OR
                                a6.a6avail2 OR a7.a7avail2 OR a8.a8avail2 OR a9.a9avail2 OR
                                a10.10avail2 OR NOT A[3]) AND a11.a11avail2;
. . .
. . .
```

APPENDIX-continued

```
D[23]        := (NOT a2.a2avail2) AND (NOT a3.a3avail2) AND
                ... (NOT a.22.a22avail2) AND A[23] AND a23avail2;

a23avail3 := NOT D[23];

E[0]         := 0

E[1]         := 0

E[2]         := 0

E[3]         := a3.a3avail3

E[4]         := (NOT a3.a3avail3) AND A[4] AND a4avail3

E[5]         := (NOT a3.a3avail3) AND (NOT a4.a4avail3) AND A[5] AND a5avail3,

E[6]         := (NOT a3.a3avail3) AND (NOT a4.a4avail3) AND (NOT a5.a5avail3) AND A[6]
                AND a6avail3

E[7]         := (NOT a3.a3avail3) AND (NOT a4.a4avail3) AND (NOT a5.a5avail3) AND
                (NOT a6.a6avail3) AND A[7] AND a7avail3;

E[8]         := (NOT a3.a3avail3) AND (NOT a4.a4avail3) AND (NOT a5.a5avail3) AND
                (NOT a6.a6avail3) AND (NOT a7.a7avail3) AND A[8] AND a8avail3;

E[9]         := (NOT a3.a3avail3) AND (NOT a4.a4avail3) AND (NOT a5.a5avail3) AND
                (NOT a6.a6avail3) AND (NOT a7.a7avail3) AND (NOT a8.a8avail3) AND A[9] AND
                9avail3;

E[10]        := (NOT a3.a3avail3) AND (NOT a4.a4avail3) AND (NOT a5.a5avail3) AND
                (NOT a6.a6avail3) AND (NOT a7.a7avail3) AND (NOT a8.a8avail3) AND
                (NOT a9.a9avail3) AND A[10] AND a10avail3;

E[11]        := NOT a3.a3avail3) AND (NOT a4.a4avail3) AND (NOT a5.a5avail3) AND
                (NOT a6.a6avail3) AND (NOT a7.a7avail3) AND (NOT a8.a8avail3) AND
                (NOT a9.a9avail3) AND (NOT a10.10avail3) AND A[11] AND a11avail3;

...
...

E[23]        := (NOT a3.a3avail2) AND (NOT a4.a4avail3) AND
                (NOT a22.a22avail3) AND A[23] AND a23avail3;

WrRSEntry    := B OR C OR D OR E

MaskRSEntry  := NOT WrRSEntry;

A :=            DeallocVec AND ALMaskRSEntry;
```

What is claimed is:

1. An apparatus for storing instructions and instruction data into an instruction scheduler of a pipelined or superscalar microprocessor, said apparatus comprising:

first vector means for indicating vacancies within said instruction scheduler;

processing means communicating with said first vector means for examining separate portions of said first vector means for vacancies and for generating a plurality of indicating means associated with said each separate portion examined, each indicating means associated with a separate portion of said first vector means representing a single vacancy of any vacancies indicated by said separate portion of said first vector means;

multiplexing means for multiplexing each of said indicating means and generating therefrom an enable vector for each of said instructions to be stored in said instruction scheduler, said enable vector for indicating a single vacant storage location within said instruction scheduler, said multiplexing means communicating with said processing means;

means for storing each of said instructions into said instruction scheduler according to a corresponding enable vector, said means for storing communicating with said enable vector for each of said instructions;

a reservation station means for storing said instructions into said instruction scheduler, said reservation station means coupled to said means for storing, and wherein said first vector means indicates vacancy within said reservation station means, wherein said first vector means is a deallocation vector having a predetermined number of entries each one bit wide, wherein each bit of said deallocation vector indicates whether or not a corresponding entry of said reservation station is vacant, wherein said processing means, for each of said separate portions of said first vector means, generates an indicating means associated with each instruction to be stored within said reservation station, wherein said instructions to be stored are four in number and wherein:

said deallocation vector is examined by said processing means in three separate portions.

2. An apparatus for storing instructions and instruction data into an instruction scheduler of a pipelined or superscalar microprocessor, said apparatus comprising:

first vector means for indicating vacancies within said instruction scheduler;

processing means communicating with said first vector means for examining separate portions of said first vector means for vacancies and for generating a plurality of indicating means associated with said each separate portion examined, each indicating means associated with a separate portion of said first vector means representing a single vacancy of any vacancies indicated by said separate portion of said first vector means;

multiplexing means for multiplexing each of said indicating means and generating therefrom an enable vector for each of said instructions to be stored in said instruction scheduler, said enable vector for indicating a single vacant storage location within said instruction scheduler, said multiplexing means communicating with said processing means;

means for storing each of said instructions into said instruction scheduler according to a corresponding enable vector, said means for storing communicating with said enable vector for each of said instructions;

a reservation station means for storing said instructions into said instruction scheduler, said reservation station means coupled to said means for storing, and wherein said first vector means indicates vacancy within said reservation station means wherein said first vector means is a deallocation vector having a predetermined number of entries each one bit wide and wherein each bit of said deallocation vector indicates whether or not a corresponding entry of said reservation station is vacant wherein said processing means, for each of said separate portions of said first vector means, generates an indicating means associated with each instruction to be stored within said reservation station, wherein said instructions to be stored are four in number and wherein:

said deallocation vector is examined by said processing means in three separate portions;

wherein said processing means generates four indicating means for each of three separate portions of said deallocation vector.

3. In a pipelined or superscalar microprocessor including an instruction scheduler, a reservation station within said instruction scheduler, and a deallocation vector for indicating vacancies within said reservation station for storage of issued instructions, an apparatus for determining highest priority vacancies within said reservation station, said apparatus comprising:

processing logic for examining separate portions of said deallocation vector for vacancies and for each issued instruction, generating a set of bitmap vectors, said set of bitmap vectors comprising a different bitmap vector corresponding to each of said separate portions of said deallocation vector, said processing logic coupled to said deallocation vector, each bitmap vector being associated with a separate portion of said deallocation vector representing a single vacancy of any vacancies indicated by said separate portion of said deallocation vector, each bit of said deallocation vector for indicating whether or not a corresponding entry of said reservation station is vacant;

logic circuitry for generating an enable vector for each of said issued instructions by executing the above for each of said issued instructions;

multiplexing logic for multiplexing each of said bitmap vectors to generate an enable vector for each of said issued instructions, said enable vector for indicating a single vacant storage location within said reservation station, said multiplexing logic coupled to said processing logic, said multiplexing logic further comprising:

first multiplexing logic for selecting a bitmap vector of a set of bitmap vectors associated with a first issued instruction, said bitmap vector selected having a highest priority vacancy of said set, second multiplexing logic for generating a first enable vector for said first issued instruction based on said bitmap vector selected by said first multiplexing logic, said second multiplexing logic coupled to said first multiplexing logic, third multiplexing logic for making available for a second issued instruction any of said bitmap vectors within said set associated with said first issued instruction that were not selected by said first multiplexing logic, said third multiplexing logic coupled to said first multiplexing logic, and logic circuitry for generating an enable vector for each of said issued instructions by executing the above for each of said issued instructions; and circuitry for updating said deallocation vector to reflect storage of said issued instructions, said circuitry for updating coupled to said enable vector for each of said issued instructions, said reservation station being a memory array of a predetermined number of entries and each of said enable vectors contains said predetermined number of entries;

said issued instructions being four in number and:
said deallocation vector and being examined by said processing logic in three separate portions.

4. In a pipelined or superscalar microprocessor including an instruction scheduler, a reservation station within said instruction scheduler, and a deallocation vector for indicating vacancies within said reservation station for storage of issued instructions, an apparatus for determining highest priority vacancies within said reservation station, said apparatus comprising:

processing logic for examining separate portions of said deallocation vector for vacancies and for each issued instruction, generating a set of bitmap vectors, said set of bitmap vectors comprising a different bitmap vector corresponding to each of said separate portions of said deallocation vector, said processing logic coupled to said deallocation vector, each bitmap vector being associated with a separate portion of said deallocation vector represents a single vacancy of any vacancies indicated by said separate portion of said deallocation vector, each bit of said deallocation vector for indicating whether or not a corresponding entry of said reservation station is vacant;

logic circuitry for generating an enable vector for each of said issued instructions by executing the above for each of said issued instructions;

multiplexing logic for multiplexing each of said bitmap vectors to generate an enable vector for each of said issued instructions, said enable vector for indicating a single vacant storage location within said reservation station, said multiplexing logic coupled to said processing logic, said multiplexing logic further comprising:

first multiplexing logic for selecting a bitmap vector of a set of bitmap vectors associated with a first issued instruction, said bitmap vector selected having a highest priority vacancy of said set, second multiplexing logic for generating a first enable vector for said first issued instruction based on said bitmap vector selected by said first multiplexing logic, said second multiplexing logic coupled to said first multiplexing logic, third multiplexing logic for making available for a second issued instruction any of said bitmap vectors within said set associated with said first issued instruction that were not selected by said first multiplexing logic, said third multiplexing logic coupled to said first multiplexing logic, and logic circuitry for generating an enable vector for each of said issued instructions by executing the above for each of said issued instructions; and circuitry for updating said deallocation vector to reflect storage of said issued instructions, said circuitry for updating coupled to said enable vector for each of said issued instructions, said reservation station being a memory array of a predetermined number of entries and each of said enable vectors contains said predetermined number of entries;

said issued instructions being four in number and:

said deallocation vector and being examined by said processing logic in three separate portions said processing logic for generating four bitmap vectors for each of three separate portions of said deallocation vector.

5. An apparatus for locating a pattern of a predetermined number of vacancies within a first vector comprising:

processing logic for examining separate portions of said first vector for vacancies and, for each of said predetermined number of vacancies, generating a set of bitmap vectors, said set of bitmap vectors comprising a bitmap vector corresponding to each of said separate portions of said first vector, each bitmap vector associated with a separate portion of said first vector representing a single vacancy of any vacancies indicated by said separate portion of said first vector, each bitmap vector of a set being generated simultaneously by said processing logic, said processing logic being coupled to said first vector;

multiplexing logic for multiplexing all sets of said bitmap vectors to generate an enable vector for each of said predetermined number of vacancies, said multiplexing logic coupled to said processing logic, said multiplexing logic comprising:

first multiplexing logic for selecting a bitmap vector of a set of bitmap vectors associated with a first of said predetermined number of vacancies, said bitmap vector selected having a highest priority vacancy of said set, second multiplexing logic for generating a first enable vector for said first of said predetermined number of vacancies based on said bitmap vector selected by said first multiplexing logic, said second multiplexing logic coupled to said first multiplexing logic, third multiplexing logic for making available for a second of said predetermined number of vacancies any of said bitmap vectors of said set that were not selected by said first multiplexing logic, said third multiplexing logic coupled to said first multiplexing logic, and logic means for generating an enable vector for each of said predetermined number of vacancies by executing the above for each of said predetermined number of vacancies;

and is examined by said processing logic in three separate portions, said reservation station is from 100 to 200 bits wide and comprises 24 entries, said each of said enable vectors contains 24 entries;

wherein said first vector is a deallocation vector which indicates vacancies within a reservation station of an instruction scheduler and;

wherein said instruction scheduler is located within a microprocessor and said predetermined number of vacancies represents a number of simultaneously issued instructions by said microprocessor; wherein said number of issued instructions being four, and said deallocation vector is examined by said processing logic in three separate portions.

6. A pipelined or superscalar microprocessor comprising:

an instruction scheduler for scheduling issued instructions for execution units, said instruction scheduler comprising:

a reservation station for storage of said issued instructions;

a deallocation vector for indicating vacancies within said reservation station;

an allocation circuit for determining vacancies within said deallocation vector, said allocation circuit coupled to said reservation station and coupled to said deallocation vector, said allocation circuit comprising:

processing logic for examining separate portions of said deallocation vector for vacancies and, for each issued instruction generating a set of bitmap vectors, said set of bitmap vectors comprising a separate bitmap vector corresponding to each of said separate portions of said deallocation vector, each bit of said deallocation vector indicates whether or not a corresponding entry of said reservation station is vacant, said reservation station being a memory array of a predetermined number of entries, each of said enable vectors being of said predetermined number of entries, said processing logic coupled to said deallocation vector, multiplexing logic for multiplexing each of said bitmap vectors to generate an enable vector for each of said issued instructions, said enable vector for indicating a single vacant storage location within said reservation station said multiplexing logic coupled to said processing logic, and means for updating said deallocation vector to reflect storage of said issued instructions, said means for updating coupled to said enable vector for each of said issued instructions;

wherein said issued instructions are four in number and wherein:

said deallocation vector is examined by said processing means in three separate portions, wherein said multiplexing logic further comprises:

first multiplexing logic for selecting a bitmap vector of a set of bitmap vectors associated with a first issued instruction, said bitmap vector selected having a highest priority vacancy of said set, second multiplexing logic for generating a first enable vector for said first issued instruction based on said bitmap vector selected by said first multiplexing logic, said second multiplexing logic coupled to said first multiplexing logic, third multiplexing logic for making available for a second issued instruction any of said bitmap vectors within said set associated with said first issued instruction that were not selected by said first multiplexing logic, said third multiplexing logic coupled to said first multiplexing logic, and logic means for generating an enable vector for each of said issued instructions by executing the above for each of said issued instructions.

7. A pipelined or superscalar microprocessor comprising:

an instruction scheduler for scheduling issued instructions for execution units, said instruction scheduler comprising:

a reservation station for storage of said issued instructions;

a deallocation vector for indicating vacancies within said reservation station;

an allocation circuit for determining vacancies within said deallocation vector, said allocation circuit coupled to said reservation station and coupled to said deallocation vector, said allocation circuit comprising:

processing logic for examining separate portions of said deallocation vector for vacancies and, for each issued instruction generating a set of bitmap vectors, said set of bitmap vectors comprising a separate bitmap vector corresponding to each of said separate portions of said deallocation vector, each bit of said deallocation vector indicates whether or not a corresponding entry of said reservation station is vacant, said reservation station being a memory array of a predetermined number of entries, each of said enable vectors being of said predetermined number of entries, said processing logic coupled to said deallocation vector, multiplexing logic for multiplexing each of said bitmap vectors to generate an enable vector for each of said issued instructions, said enable vector for indicating a single vacant storage location within said reservation station said multiplexing logic coupled to said processing logic, and means for updating said deallocation vector to reflect storage of said issued instructions, said means for updating coupled to said enable vector for each of said issued instructions wherein said issued instructions are four in number and wherein:

said deallocation vector is examined by said processing means in three separate portions, wherein said multiplexing logic further comprises:

first multiplexing logic for selecting a bitmap vector of a set of bitmap vectors associated with a first issued instruction, said bitmap vector selected having a highest priority vacancy of said set, second multiplexing logic for generating a first enable vector for said first issued instruction based on said bitmap vector selected by said first multiplexing logic, said second multiplexing logic coupled to said first multiplexing logic, third multiplexing logic for making available for a second issued instruction any of said bitmap vectors within said set associated with said first issued instruction that were not selected by said first multiplexing logic, said third multiplexing logic coupled to said first multiplexing logic, and logic means for generating an enable vector for each of said issued instructions by executing the above for each of said issued instructions; and wherein said processing logic generates four bitmap vectors for each of three separate portions of said deallocation vector.

8. In a pipelined or superscalar microprocessor including an instruction scheduler, a reservation station within said instruction scheduler for storage of issued instructions, and a deallocation vector for indicating vacancies within said reservation station, a method implemented in logic for determining highest priority vacancies within said reservation station, said method comprising the logic implemented steps of:

a first step of examining separate portions of said deallocation vector for vacancies and, for each issued instruction, generating a set of bitmap vectors, said set of bitmap vectors comprising a bitmap vector corresponding to each of said separate portions of said deallocation vector examined, wherein each bitmap vector associated with a separate portion of said deallocation vector represents a single vacancy of any vacancies indicated by said separate portion of said deallocation vector, wherein each bit of said deallocation vector indicates whether or not a corresponding entry of said reservation station is vacant;

a second step of multiplexing each of said bitmap vectors to generate an enable vector for each of said issued instructions, said enable vector for indicating a single vacant storage location within said reservation station, said step of multiplexing responsive to said first step of examining, wherein said second step further comprises the steps of:

selecting a bitmap vector of a set of bitmap vectors associated with a first issued instruction, said bitmap vector selected having a highest priority vacancy of said set, generating a first enable vector for said first issued instruction based on said bitmap vector selected by said selecting step, making available for a second issued instruction any of said bitmap vectors within said set associated with said first issued instruction that were not selected by said selecting step; and generating an enable vector for each of said issued instructions by repeating the above steps for each of said issued instructions;

a third step of updating said deallocation vector to reflect storage of said issued instructions, said third step of updating responsive to said second step of multiplexing;

wherein said issued instructions are four in number and wherein:

said deallocation vector is examined by said processing means in three separate portions, wherein said reservation station is a memory array of a predetermined number of entries and each of said enable vectors is of said predetermined number.

9. In a pipelined or superscalar microprocessor including an instruction scheduler, a reservation station within said instruction scheduler for storage of issued instructions, and a deallocation vector for indicating vacancies within said reservation station, a method implemented in logic for determining highest priority vacancies within said reservation station, said method comprising the logic implemented steps of:

a first step of examining separate portions of said deallocation vector for vacancies and, for each issued instruction, generating a set of bitmap vectors, said set of bitmap vectors comprising a bitmap vector corresponding to each of said separate portions of said deallocation vector examined, wherein each bitmap vector associated with a separate portion of said deallocation vector represents a single vacancy of any vacancies indicated by said separate portion of said deallocation vector, wherein each bit of said deallocation vector indicates whether or not a corresponding entry of said reservation station is vacant, wherein said first step generates four bitmap vectors for each of three separate portions of said deallocation vector;

a second step of multiplexing each of said bitmap vectors to generate an enable vector for each of said issued instructions, said enable vector for indicating a single vacant storage location within said reservation station, said step of multiplexing responsive to said first step of examining, wherein said second step further comprises the steps of:

selecting a bitmap vector of a set of bitmap vectors associated with a first issued instruction, said bitmap vector selected having a highest priority vacancy of said set, generating a first enable vector for said first issued instruction based on said bitmap vector selected by said selecting step, making available for a second issued instruction any of said bitmap vectors within said set associated with said first issued instruction that were not selected by said selecting step, and generating an enable vector for each of said issued instructions by repeating the above steps for each of said issued instructions;

a third step of updating said deallocation vector to reflect storage of said issued instructions, said third step of updating responsive to said second step of multiplexing;

wherein said issued instructions are four in number and wherein:

said deallocation vector is examined by said processing means in three separate portions, wherein said reservation station is a memory array of a predetermined number of entries and each of said enable vectors is of said predetermined number.

10. In a pipelined or superscalar microprocessor including an instruction scheduler, a reservation station within said instruction scheduler, and a deallocation vector for indicating vacancies within said reservation station for storage of issued instructions, an apparatus for determining highest priority vacancies within said reservation station, said apparatus comprising:

processing logic for examining separate portions of said deallocation vector for vacancies and for each issued instruction, generating a set of bitmap vectors, said set of bitmap vectors comprising a different bitmap vector corresponding to each of said separate portions of said deallocation vector, said processing logic coupled to said deallocation vector;

multiplexing logic for multiplexing each of said bitmap vectors to generate an enable vector for each of said issued instructions, said enable vector for indicating a single vacant storage location within said reservation station, said multiplexing logic coupled to said processing logic;

circuitry for updating said deallocation vector to reflect storage of said issued instructions, said circuitry for updating coupled to said enable vector for each of said issued instructions;

wherein said issued instructions are four in number and wherein:

said deallocation vector is examined by said processing logic in three separate portions, and wherein said processing logic generates four bitmap vectors for each of three separate portions of said deallocation vector.

11. An apparatus for determining highest priority vacancies within said reservation station as described in claim 10 further comprising enable logic for enabling vacant storage locations of said reservation station to receive said issued instructions according to each enable vector, said enable logic coupled to said each enable vector;

wherein each bitmap vector associated with a separate portion of said deallocation vector represents a single vacancy of any vacancies indicated by said separate portion of said deallocation vector; and wherein said enable logic comprises a pass gate network for directing each instruction to a particular vacant entry of said reservation station depending on an associated enable vector, said each enable vector coupled to said pass gate network.

12. An apparatus for determining highest priority vacancies within said reservation station as described in claim 11 wherein said multiplexing logic further comprises:

first multiplexing logic for selecting a bitmap vector of a set of bitmap vectors associated with a first issued instruction, said bitmap vector selected having a highest priority vacancy of said set;

second multiplexing logic for generating a first enable vector for said first issued instruction based on said bitmap vector selected by said first multiplexing logic, said second multiplexing logic coupled to said first multiplexing logic;

third multiplexing logic for making available for a second issued instruction any of said bitmap vectors within said set associated with said first issued instruction that were not selected by said first multiplexing logic, said third multiplexing logic coupled to said first multiplexing logic; and logic circuitry for generating an enable vector for each of said issued instructions by executing the above for each of said issued instructions.

13. An apparatus for determining highest priority vacancies within said reservation station as described in claim 12 wherein each bit of said deallocation vector indicates whether or not a corresponding entry of said reservation station is vacant; and wherein said reservation station is a memory array of a predetermined number of entries and each of said enable vectors contains said predetermined number of entries.

14. A pipelined or superscalar microprocessor as described in claim 10 further comprising enable logic for enabling vacant storage locations of said reservation station to receive said issued instructions according to said enable vectors, said enable logic coupled to said enable vectors; and wherein each bitmap vector associated with a separate portion of said deallocation vector represents a single vacancy of any vacancies indicated by said separate portion of said deallocation vector.

15. A computer system comprising:

bus means for providing a communication pathway for said computer system, a pipelined or superscalar microprocessor coupled to said bus means, said microprocessor comprising an instruction scheduler, memory means coupled to said bus means, and information storage means coupled to said bus means;

wherein said instruction scheduler for scheduling instructions to execution units of said microprocessor and comprises: a reservation station for storage of said instructions; a deallocation vector for indicating vacancies within said reservation station, and an allocation circuit for determining highest priority vacancies within said deallocation circuit; and wherein said allocation circuit comprises:

processing logic for examining separate portions of said deallocation vector for vacancies and, for each issued instruction, generating a set of bitmap vectors, said set of bitmap vectors comprising a separate bitmap vector corresponding to each of said separate portions of said deallocation vector, said processing logic coupled to said deallocation vector;

multiplexing logic coupled to said processing logic for multiplexing each of said bitmap vectors to generate an enable vector for each of said issued instructions, said enable vector for indicating a vacant storage location within said reservation station; and means for updating said deallocation vector to reflect storage of said issued instructions wherein:
said deallocation vector is examined by said processing means in three separate portions;
wherein said processing logic generates four bitmap vectors for each of three separate portions of said deallocation vector.

16. A computer system as described in claim 15 further comprising enable logic for enabling vacant storage locations of said reservation station to receive said instructions according to said enable vectors, said enable logic coupled to said enable vectors:
wherein each bitmap vector associated with a separate portion of said deallocation vector represents a single vacancy of any vacancies indicated by said separate portion of said deallocation vector.

17. A computer system as described in claim 16 wherein said multiplexing logic further comprises:
first multiplexing logic for selecting a bitmap vector of a set of bitmap vectors associated with a first issued instruction, said bitmap vector selected having a highest priority vacancy of said set;
second multiplexing logic for generating a first enable vector for said first issued instruction based on said bitmap vector selected by said first multiplexing logic, said second multiplexing logic coupled to said first multiplexing logic;
third multiplexing logic for making available for a second issued instruction any of said bitmap vectors within said set associated with said first issued instruction that were not selected by said first multiplexing logic, said third multiplexing logic coupled to said first multiplexing logic; and
logic means for generating an enable vector for each of said issued instructions.

18. A computer system as described in claim 17 wherein each bit of said deallocation vector indicates whether or not a corresponding entry of said reservation station is vacant; and
wherein said reservation station is a memory array of a predetermined number of entries and each of said enable vectors is of said predetermined number of entries.

19. In a pipelined or superscalar microprocessor including an instruction scheduler, a reservation station within said instruction scheduler for storage of issued instructions, and a deallocation vector for indicating vacancies within said reservation station, a method implemented in logic for determining highest priority vacancies within said reservation station, said method comprising the logic implemented steps of:
a first step of examining separate portions of said deallocation vector for vacancies and, for each issued instruction, generating a set of bitmap vectors, said set of bitmap vectors comprising a bitmap vector corresponding to each of said separate portions of said deallocation vector examined;
a second step of multiplexing each of said bitmap vectors to generate an enable vector for each of said issued instructions, said enable vector for indicating a single vacant storage location within said reservation station, said step of multiplexing responsive to said first step of examining; and
a third step of updating said deallocation vector to reflect storage of said issued instructions, said third step of updating responsive to said second step of multiplexing,
wherein said issued instructions are four in number and wherein:
said deallocation vector is examined by said processing means in three separate portions;
wherein said first step generates four bitmap vectors for each of three separate portions of said deallocation vector.

20. A method implemented in logic for determining highest priority vacancies within said reservation station as described in claim 19 further comprising the logic implemented step of enabling vacant storage locations of said reservation station to receive said issued instructions according to said enable vectors,
wherein each bitmap vector associated with a separate portion of said deallocation vector represents a single vacancy of any vacancies indicated by said separate portion of said deallocation vector.

21. A method implemented in logic for determining highest priority vacancies within said reservation station as described in claim 20 wherein said second step further comprises the steps of:
selecting a bitmap vector of a set of bitmap vectors associated with a first issued instruction, said bitmap vector selected having a highest priority vacancy of said set;
generating a first enable vector for said first issued instruction based on said bitmap vector selected by said selecting step;
making available for a second issued instruction any of said bitmap vectors within said set associated with said first issued instruction that were not selected by said selecting step; and
generating an enable vector for each of said issued instructions by repeating the above steps for each of said issued instructions,
wherein said enable vector for each of said issued instructions contains only one vacancy indicator for a single storage location within said reservation station,
wherein each bit of said deallocation vector indicates whether or not a corresponding entry of said reservation station is vacant,
wherein said reservation station is a memory array of a predetermined number of entries and each of said enable vectors is of said predetermined number.

22. An apparatus for storing instructions and instruction data into an instruction scheduler of a pipelined or superscalar microprocessor, said apparatus comprising:
first vector means for indicating vacancies within said instruction scheduler;
processing means communicating with said first vector means for examining separate portions of said first vector means for vacancies and for generating a plurality of indicating means associated with said each separate portion examined;

multiplexing means for multiplexing each of said indicating means and generating therefrom an enable vector for each of said instructions to be stored in said instruction scheduler, said enable vector for indicating a single vacant storage location within said instruction scheduler, said multiplexing means communicating with said processing means saint multiplexing means further comprises:
  means for examining said plurality of indicating means for selecting one of said indicating means with a highest current priority vacancy;
  means for equating a next enable vector to said indicating means containing said next highest priority, said enable vector indicating a location within said instruction scheduler for storage of an associated instruction and associated instruction information, said means for equating coupled to said means for examining;
  means for storing each of said instructions into said instruction scheduler according to a corresponding enable vector, said means for storing communicating with said enable vector for each of said instructions;
  a reservation station means for storing said instructions into said instruction scheduler, said reservation station means coupled to said means for storing, and wherein said first vector means indicates vacancy within said reservation station means;
  wherein each indicating means associated with a separate portion of said first vector means represents a single vacancy of any vacancies indicated by said separate portion of said first vector means;
  wherein said means for storing comprises a pass gate logic network coupled to each enable vector and coupled to said instruction scheduler for directing instructions into said instruction scheduler;
  wherein said first vector means is a deallocation vector having a predetermined number of entries each one bit wide and wherein each bit of said deallocation vector indicates whether or not a corresponding entry of said reservation station is vacant;
  wherein said reservation station is a memory array of said predetermined number of entries and each of said enable vectors contain said predetermined number of entries;
  wherein said processing means, for each of said separate portions of said first vector means, generates an indicating means associated with each instruction to be stored within said reservation station;
  wherein said instructions to be stored are four in number and wherein:
    said deallocation vector is examined by said processing means in three separate portions;
    wherein said processing means generates four indicating means for each of three separate portions of said deallocation vector.

23. In a pipelined or superscalar microprocessor including an instruction scheduler, a reservation station within said instruction scheduler, and a deallocation vector for indicating vacancies within said reservation station for storage of issued instructions, an apparatus for determining highest priority vacancies within said reservation station, said apparatus comprising:
  processing logic for examining separate portions of said deallocation vector for vacancies and for each issued instruction, generating a set of bitmap vectors, said set of bitmap vectors comprising a different bitmap vector corresponding to each of said separate portions of said deallocation vector, said processing logic coupled to said deallocation vector;
  multiplexing logic for multiplexing each of said bitmap vectors to generate an enable vector for each of said issued instructions, said enable vector for indicating a single vacant storage location within said reservation station, said multiplexing logic coupled to said processing logic;
  circuitry for updating said deallocation vector to reflect storage of said issued instructions, said circuitry for updating coupled to said enable vector for each of said issued instructions; and
  enable logic for enabling vacant storage locations of said reservation station to receive said issued instructions according to each enable vector, said enable logic coupled to said each enable vector;
  wherein each bitmap vector associated with a separate portion of said deallocation vector represents a single vacancy of any vacancies indicated by said separate portion of said deallocation vector;
  wherein said multiplexing logic further comprises:
    first multiplexing logic for selecting a bitmap vector of a set of bitmap vectors associated with a first issued instruction, said bitmap vector selected having a highest priority vacancy of said set,
    second multiplexing logic for generating a first enable vector for said first issued instruction based on said bitmap vector selected by said first multiplexing logic, said second multiplexing logic coupled to said first multiplexing logic,
    third multiplexing logic for making available for a second issued instruction any of said bitmap vectors within said set associated with said first issued instruction that were not selected by said first multiplexing logic, said third multiplexing logic coupled to said first multiplexing logic, and
    logic circuitry for generating an enable vector for each of said issued instructions by executing the above for each of said issued instructions;
  wherein said enable logic comprises a pass gate network for directing each instruction to a particular vacant entry of said reservation station depending on an associated enable vector, said each enable vector coupled to said pass gate network;
  wherein each bit of said deallocation vector indicates whether or not a corresponding entry of said reservation station is vacant;
  wherein said reservation station is a memory array of a predetermined number of entries and each of said enable vectors contains said predetermined number of entries;
  wherein said issued instructions are four in number and wherein:
    said deallocation vector is examined by said processing logic in three separate portions,
  wherein said processing logic generates four bitmap vectors for each of three separate portions of said deallocation vector.

* * * * *

UNITED STATES PATENT AND TRADEMARK OFFICE
CERTIFICATE OF CORRECTION

| | | |
|---|---|---|
| PATENT NO. | : | 5,560,025 |
| DATED | : | September 24, 1996 |
| INVENTOR(S) | : | Gupta et al. |

It is certified that error appears in the above-identified patent and that said Letters Patent is hereby corrected as shown below:

In column 39 at line 7 delete "saint" and insert --said--

Signed and Sealed this

Eighteenth Day of March, 1997

Attest:

BRUCE LEHMAN

Attesting Officer

Commissioner of Patents and Trademarks